US010182174B2

(12) United States Patent
Kusano et al.

(10) Patent No.: US 10,182,174 B2
(45) Date of Patent: Jan. 15, 2019

(54) INFORMATION PROCESSING DEVICE

(71) Applicant: FUJI XEROX CO., LTD., Tokyo (JP)

(72) Inventors: Nobumi Kusano, Kanagawa (JP); Tadao Michimura, Kanagawa (JP); Ichiro Shiozaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/479,792

(22) Filed: Apr. 5, 2017

(65) Prior Publication Data

US 2018/0115679 A1    Apr. 26, 2018

(30) Foreign Application Priority Data

Oct. 25, 2016 (JP) .................. 2016-208592

(51) Int. Cl.
| | | |
|---|---|---|
| *H04N 1/00* | (2006.01) | |
| *H04N 1/333* | (2006.01) | |
| *G06K 15/02* | (2006.01) | |
| *G06F 3/12* | (2006.01) | |

(52) U.S. Cl.
CPC ..... *H04N 1/33376* (2013.01); *H04N 1/00424* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,518,983 | B1* | 2/2003 | Grohmann | G06F 9/451 |
| | | | | 715/781 |
| 6,894,792 | B1* | 5/2005 | Abe | G06F 3/1207 |
| | | | | 358/1.13 |
| 6,917,437 | B1* | 7/2005 | Myers | G06F 3/1207 |
| | | | | 358/1.13 |
| 8,473,848 | B2* | 6/2013 | Bells | G06F 3/0484 |
| | | | | 715/744 |
| 2001/0028808 | A1* | 10/2001 | Nomura | H04N 1/00352 |
| | | | | 399/81 |
| 2002/0057455 | A1* | 5/2002 | Gotoh | G06F 3/1207 |
| | | | | 358/1.15 |
| 2002/0060700 | A1* | 5/2002 | Sone | G08B 5/226 |
| | | | | 715/810 |
| 2003/0225946 | A1* | 12/2003 | Allen | H04N 1/32122 |
| | | | | 710/8 |

(Continued)

FOREIGN PATENT DOCUMENTS

| | | |
|---|---|---|
| JP | 2002-296981 A | 10/2002 |
| JP | 2011-193405 A | 9/2011 |

(Continued)

*Primary Examiner* — Beniyam Menberu
(74) *Attorney, Agent, or Firm* — Oliff PLC

(57) ABSTRACT

An information processing device includes an informing unit. The informing unit provides information concerning a state of processing in a first informing mode and information concerning an object of the processing in a second informing mode at the same time. The first informing mode is a mode for providing information by using a first attribute which forms elements. The second informing mode is a mode for providing information by using, among the elements, a second attribute, which is different from the first attribute used in the first informing mode.

9 Claims, 24 Drawing Sheets

(56) References Cited

U.S. PATENT DOCUMENTS

| | | | | |
|---|---|---|---|---|
| 2005/0018236 A1* | 1/2005 | Shirai | ............... | G06F 3/1204 358/1.14 |
| 2005/0039142 A1* | 2/2005 | Jalon | ............... | G06Q 10/109 715/823 |
| 2006/0017845 A1* | 1/2006 | Onomatsu | ......... | H04N 5/44504 348/468 |
| 2006/0221356 A1* | 10/2006 | Kawai | ............ | H04N 1/00204 358/1.1 |
| 2008/0170270 A1* | 7/2008 | Watanabe | ......... | H04N 1/00832 358/296 |
| 2010/0296830 A1* | 11/2010 | Kamata | ............ | G03G 15/6508 399/81 |
| 2011/0231800 A1 | 9/2011 | Tomita et al. | | |
| 2012/0008158 A1 | 1/2012 | Tani et al. | | |
| 2012/0200586 A1* | 8/2012 | Lima | ............... | G06F 9/4443 345/582 |
| 2012/0218596 A1* | 8/2012 | Hashimoto | ......... | G06F 3/1207 358/1.15 |
| 2012/0307301 A1* | 12/2012 | Otomaru | ............ | G06K 15/002 358/1.15 |
| 2013/0207988 A1* | 8/2013 | Artigue | ............... | G06F 9/451 345/589 |
| 2016/0196006 A1* | 7/2016 | Doan | ............... | G06F 3/0481 715/779 |
| 2017/0228895 A1* | 8/2017 | Lee | ............ | G06T 11/001 |

FOREIGN PATENT DOCUMENTS

| | | |
|---|---|---|
| JP | 2012-018601 A | 1/2012 |
| JP | 2013-254290 A | 12/2013 |
| JP | 2015-144017 A | 8/2015 |

\* cited by examiner

FIG. 4

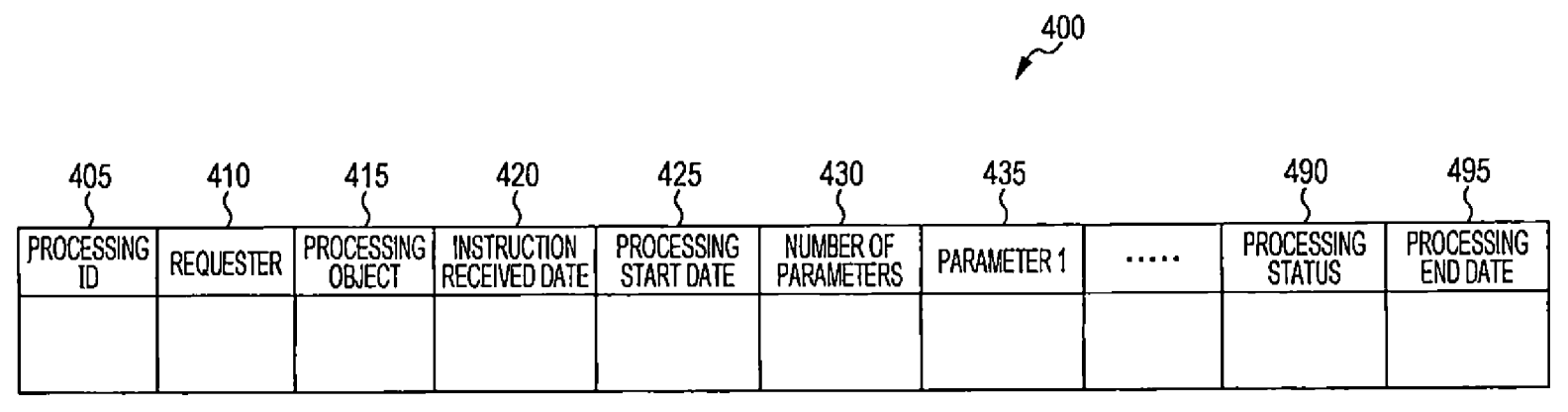

| 405 | 410 | 415 | 420 | 425 | 430 | 435 | 490 | 495 |
|---|---|---|---|---|---|---|---|---|
| PROCESSING ID | REQUESTER | PROCESSING OBJECT | INSTRUCTION RECEIVED DATE | PROCESSING START DATE | NUMBER OF PARAMETERS | PARAMETER 1 ..... | PROCESSING STATUS | PROCESSING END DATE |
|  |  |  |  |  |  |  |  |  |

| COLOR SET ID | ICON | COLOR SET ||||| 
|---|---|---|---|---|---|---|
| | | MAIN (SINGLE COLOR) | MAIN (TEXTURE PATTERN) | SHADE | HIGHLIGHT COLOR | CHARACTER COLOR |
| 505 | 510 | 517 | 519 | 521 | 523 | 525 |

500
515

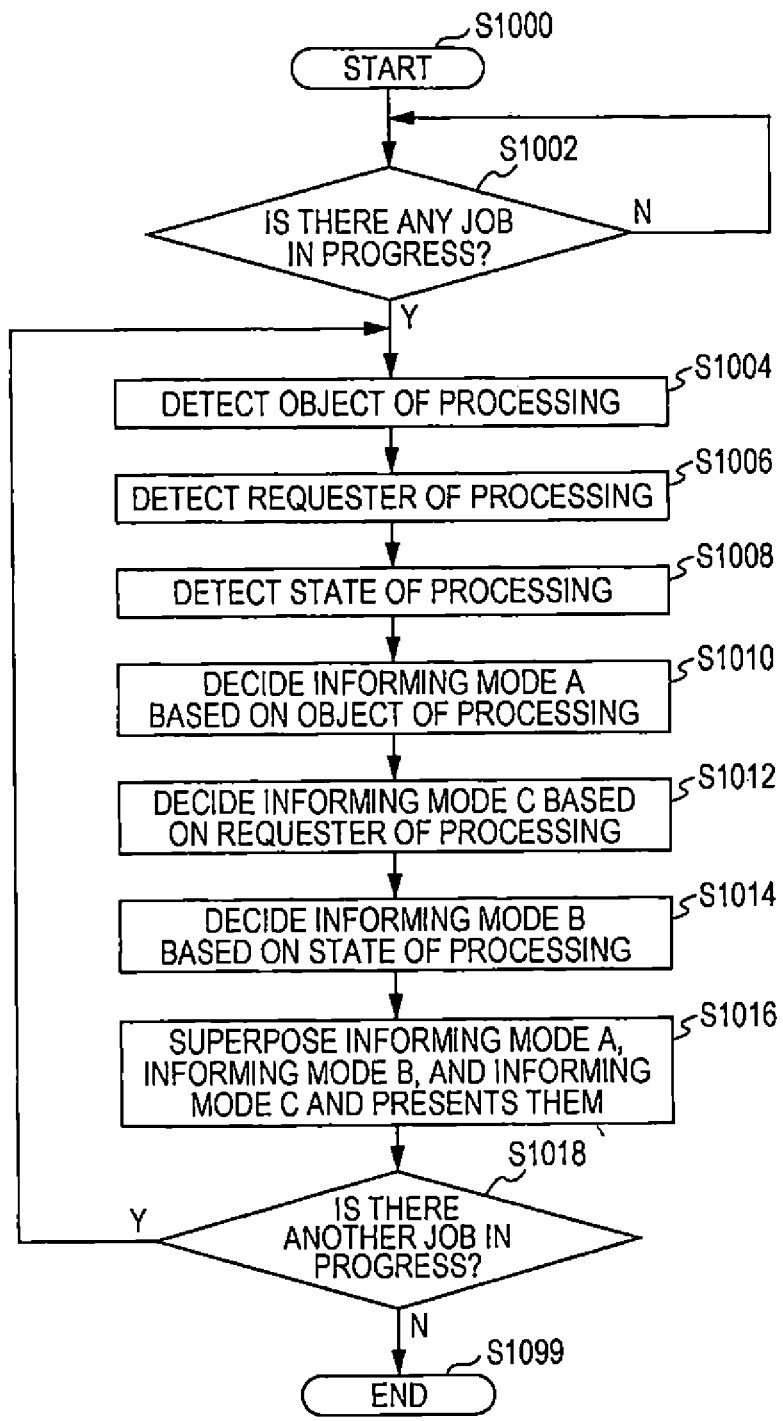

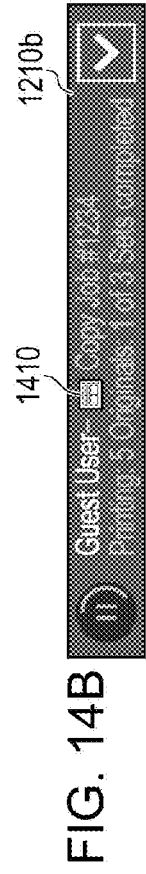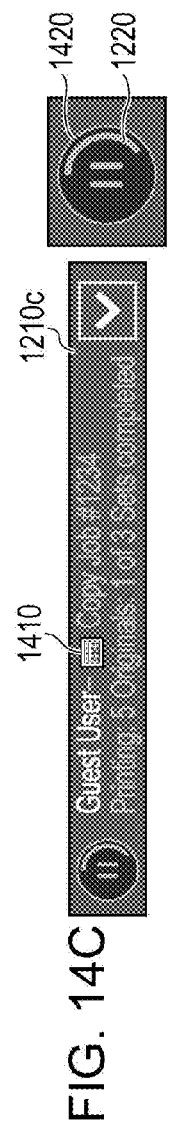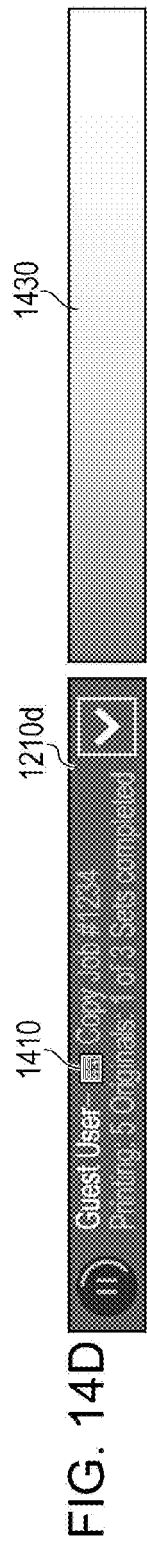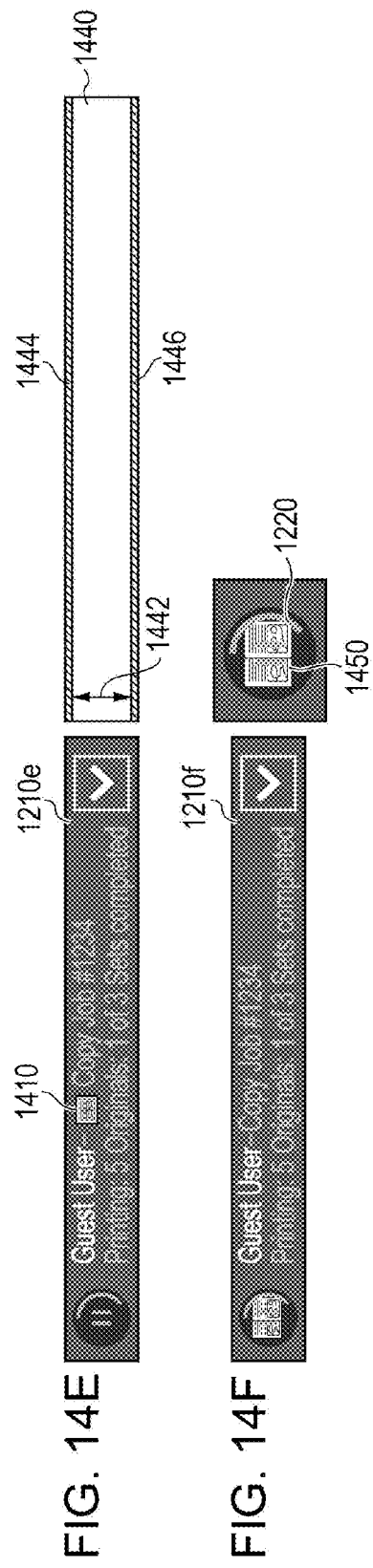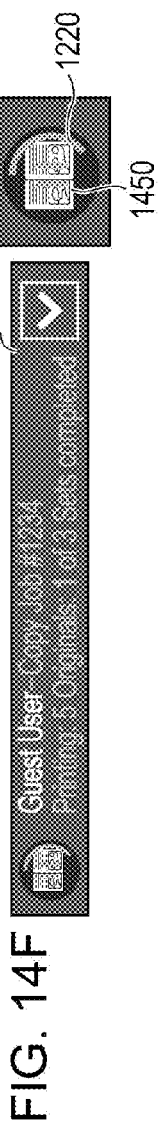

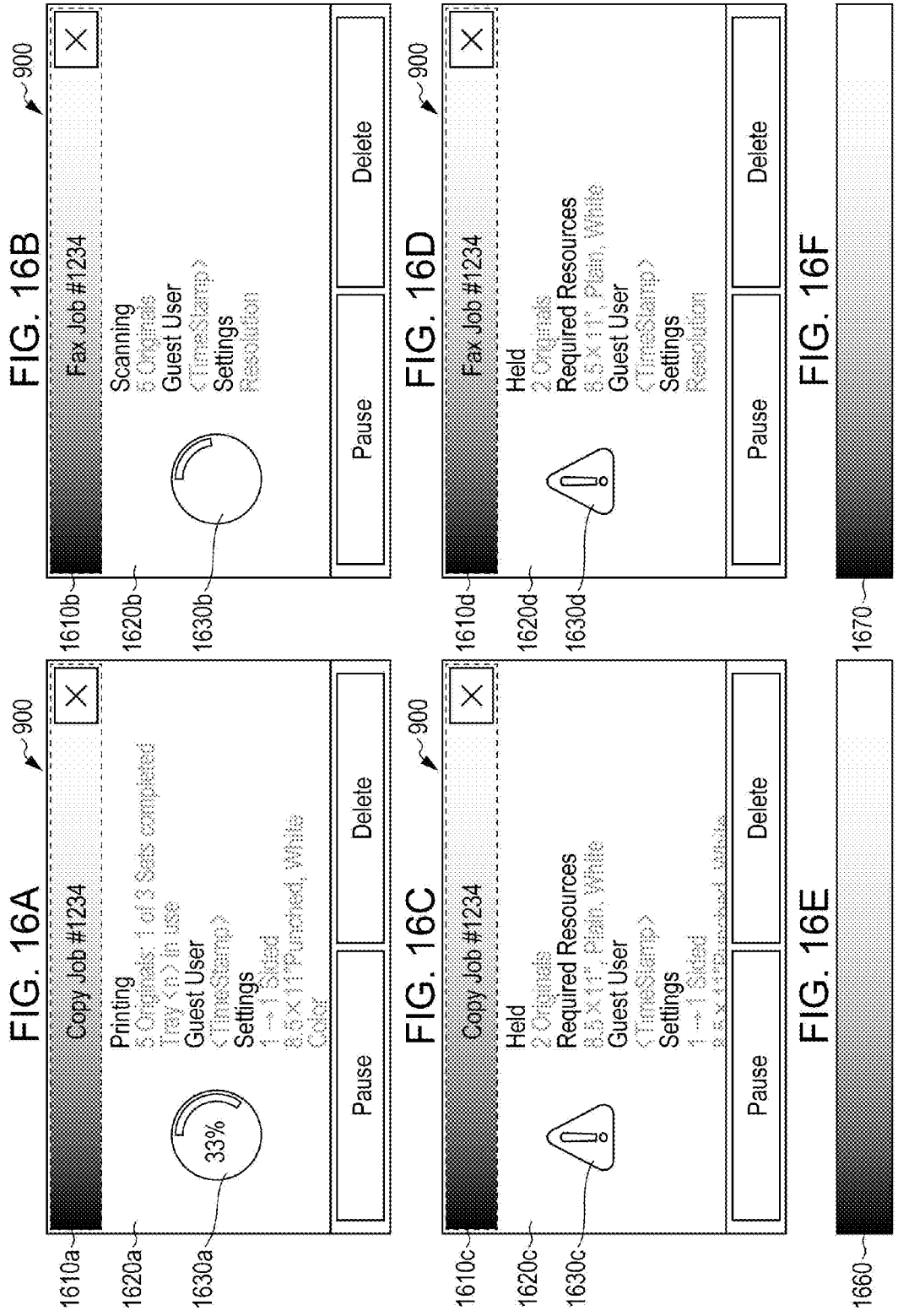

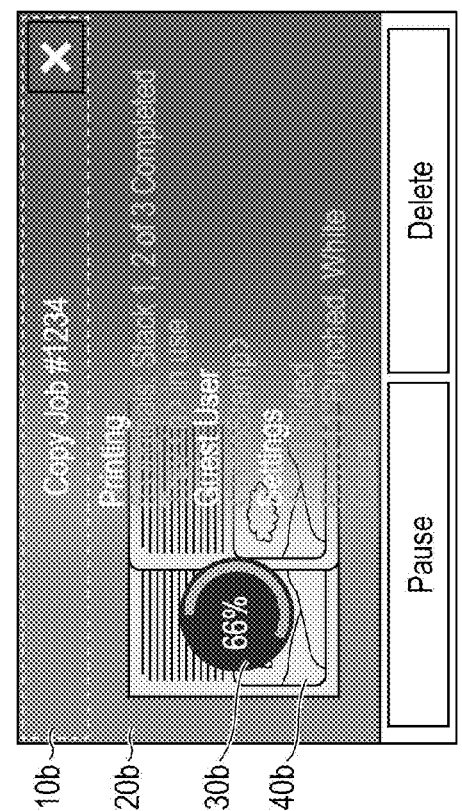
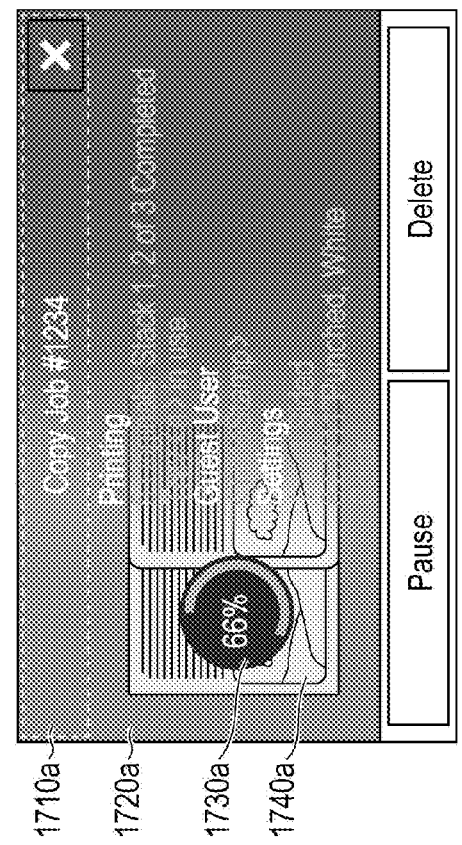

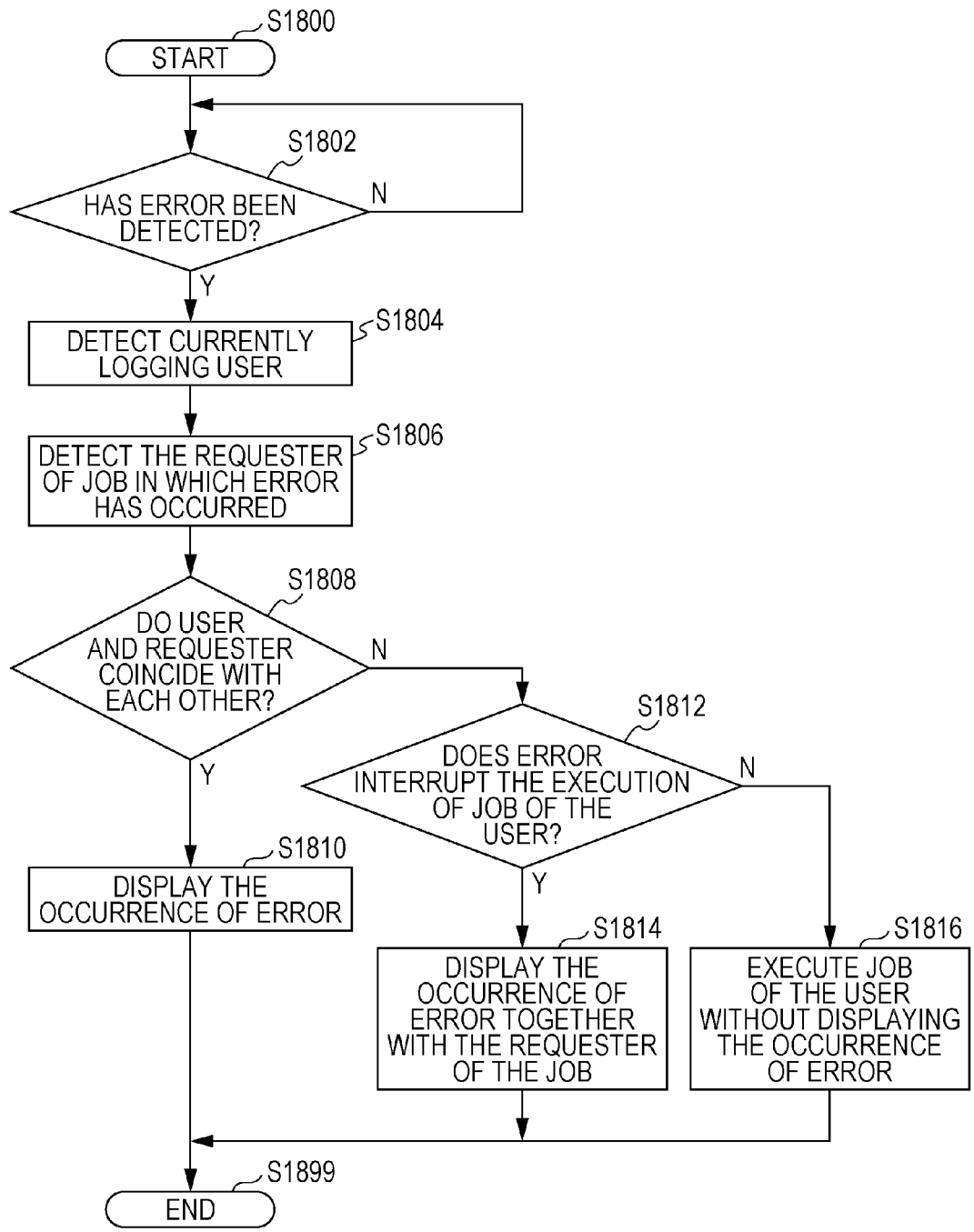

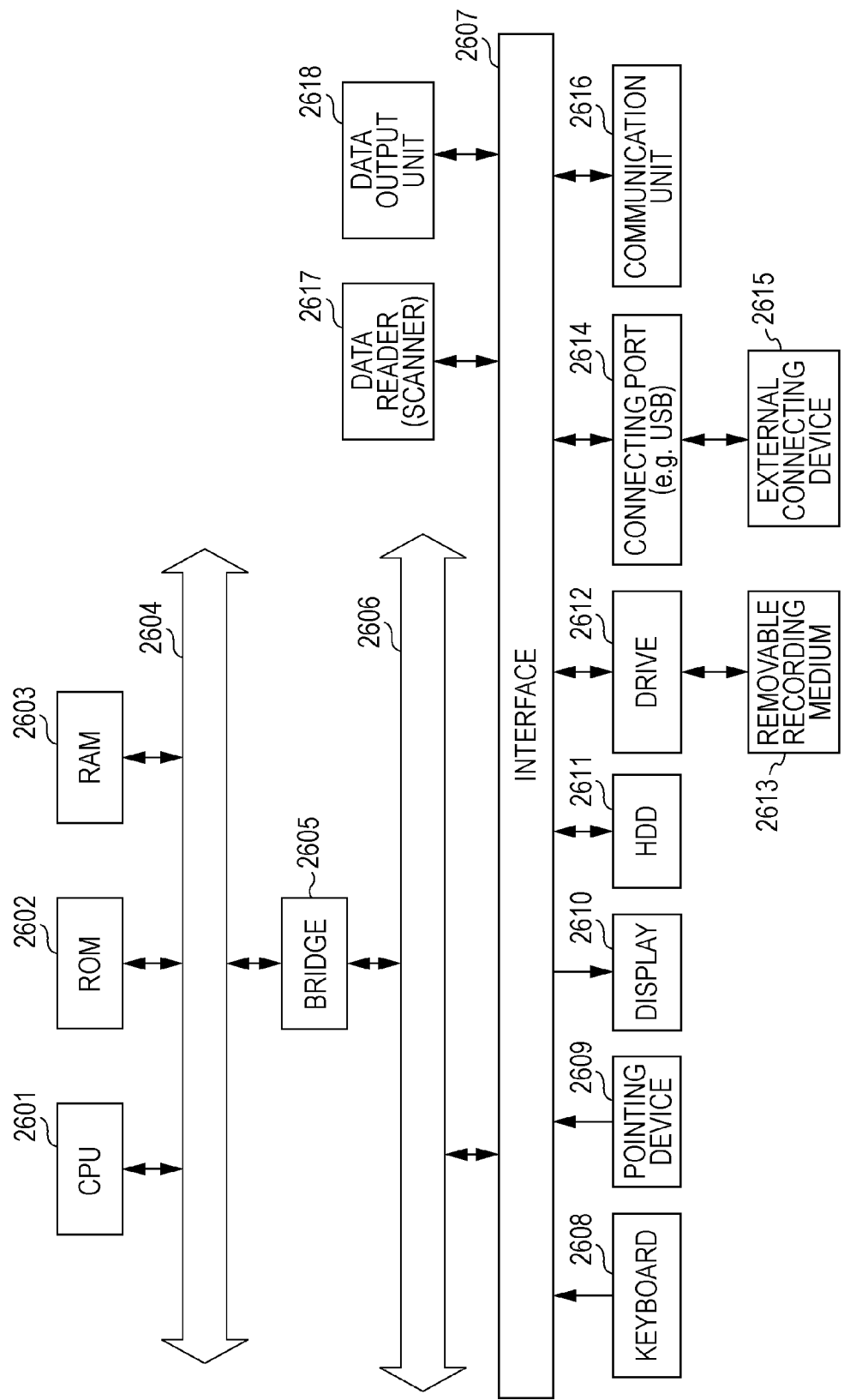

INFORMATION PROCESSING DEVICE

CROSS-REFERENCE TO RELATED APPLICATIONS

This application is based on and claims priority under 35 USC 119 from Japanese Patent Application No. 2016-208592 filed Oct. 25, 2016.

BACKGROUND

Technical Field

The present invention relates to an information processing device.

SUMMARY

According to an aspect of the invention, there is provided an information processing device including an informing unit. The informing unit provides information concerning a state of processing in a first informing mode and information concerning an object of the processing in a second informing mode at the same time. The first informing mode is a mode for providing information by using a first attribute which forms elements. The second informing mode is a mode for providing information by using, among the elements, a second attribute, which is different from the first attribute used in the first informing mode.

BRIEF DESCRIPTION OF THE DRAWINGS

An exemplary embodiment of the present invention will be described in detail based on the following figures, wherein:

FIG. 4 illustrates an example of the data structure of a processing information table;

FIG. 5A illustrates an example of the data structure of a color set table;

FIG. 10 is a flowchart illustrating an example of processing executed in the exemplary embodiment;

FIGS. 14A through 14F are views for explaining examples of processing in the exemplary embodiment;

FIGS. 16A through 16F are views for explaining examples of processing in the exemplary embodiment;

FIGS. 17A and 17B are views for explaining examples of processing in the exemplary embodiment;

FIG. 18 is a flowchart illustrating an example of processing executed in the exemplary embodiment;

FIG. 26 is a block diagram illustrating an example of the hardware configuration of a computer implementing the exemplary embodiment.

DETAILED DESCRIPTION

Before describing the exemplary embodiment, a device which forms a base of this exemplary embodiment will first be discussed. This description will be given for easy understanding of this exemplary embodiment.

Some devices execute processing in response to an instruction from a user. An example of such devices is a multifunction device (image processing device having two or more functions of a scanner, a printer, a copying machine, and a fax machine).

Such a device is required to inform a user of the execution state of processing. To inform a user of the state of processing, such as the current stage of processing and the occurrence of an error in processing, so that the user can easily recognize such states, characteristic modes (such as graphics, animated images, and sound) may specially be prepared and provided.

In this case, the name of an application started by the user may be displayed on a screen. However, mere text information, such as the name of an application, may not be sufficient for the user to instantly recognize about which processing information has been provided, particularly in the following cases.

Many applications are installed in a device.

In addition to processing executed as a result of the user using applications, the system may be started by an instruction from an external source, such as a network, and information concerning such processing may also be provided.

Shortcut or compound processing may be executed in accordance with a workflow based on installed applications or device functions.

Other users may start processing, and processing continues as background processing after a user started processing has left the place.

The exemplary embodiment of the invention will be described below with reference to the accompanying drawings.

Figure 1:
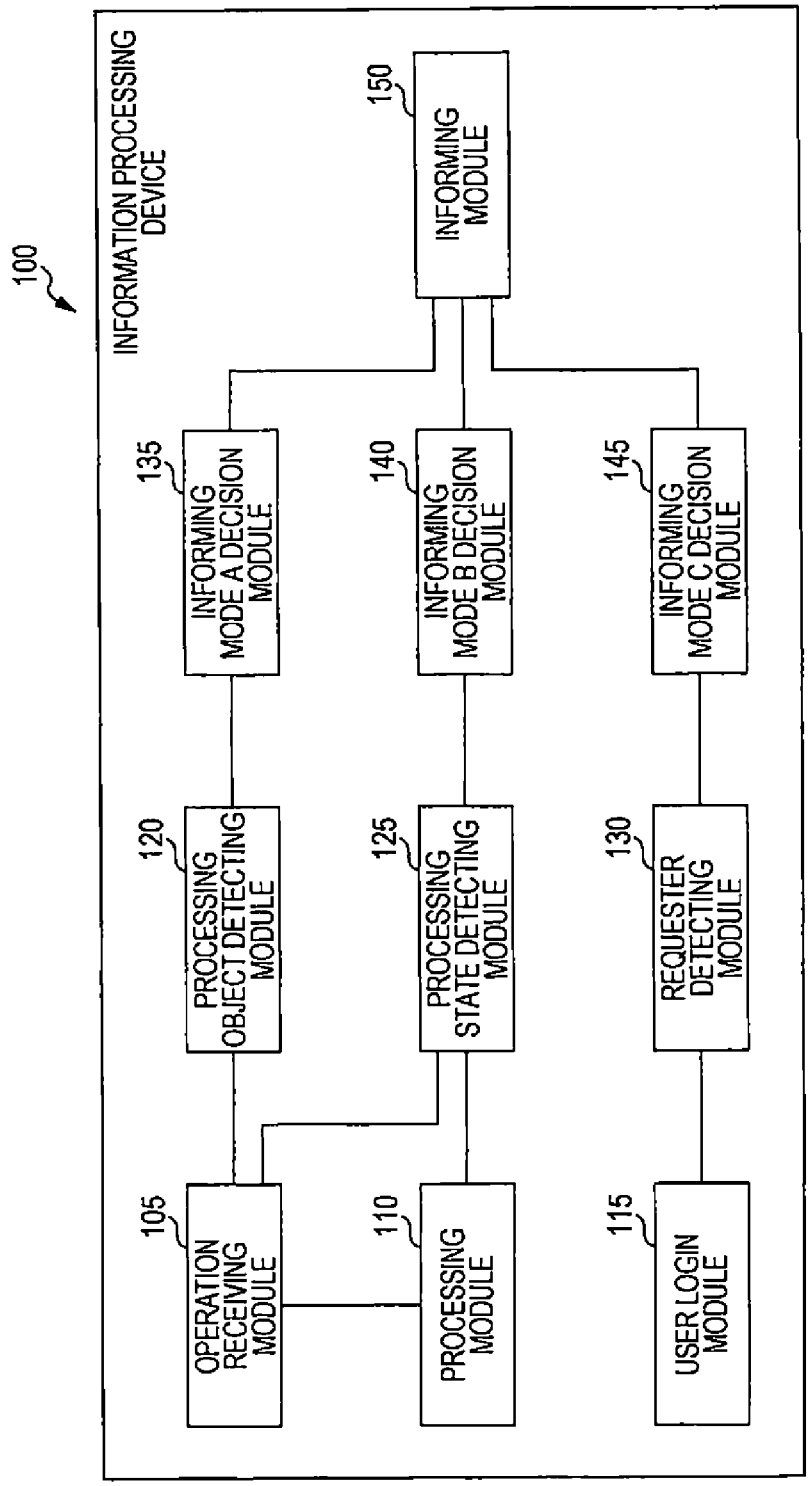
FIG. 1 is a block diagram of conceptual modules forming an example of the configuration of the exemplary embodiment.

FIG. 1 is a block diagram of conceptual modules forming an example of the configuration of the exemplary embodiment.

Generally, modules are software (computer programs) components or hardware components that can be logically separated from one another. The modules of the exemplary embodiment of the invention are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary.

A system or an apparatus may be implemented by connecting plural computers, hardware units, devices, etc., to one another via a communication medium, such as a network (including communication based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk (HD), a random access memory (RAM), an external storage medium, a storage device using a communication line (including a network), a register within a central processing unit (CPU), etc.

An information processing device 100 according to the exemplary embodiment receives an instruction from a user and executes processing. As shown in FIG. 1, the information processing device 100 includes an operation receiving module 105, a processing module 110, a user login module 115, a processing object detecting module 120, a processing state detecting module 125, a requester detecting module 130, an informing mode A decision module 135, an informing mode B decision module 140, an informing mode C decision module 145, and an informing module 150. The information processing device 100 may be used by plural users, and more specifically, it may be used by a user operating the information processing device 100 (user physically near the information processing device 100) and by another user at a remote place by remote control. The information processing device 100 may be a copying machine, a fax machine, a scanner, a printer, or a multifunction device.

The information processing device 100 utilizes existing mental models of a user. The information processing device 100 also assists in constructing mental models concerning its unique features and enables a user to instantly understand the content of given information, based on the constructed mental models. To implement this, three informing modes are utilized. A mental model represents a user's process of recognizing the state of the information processing device 100, for example. The user's existing mental models are internal representations that the user has already acquired.

Information concerning "the state of processing" is provided to a user in its unique mode according to the type of state. The state of processing is displayed in the form of representations that match the user's existing mental models, and the user does not have to learn when using the information processing device 100. Even if the user does not have existing mental models, the user can easily learn.

Many users recognize based on their mental models that a sandglass, an animated image rotating round, and an animated image moving back and forth on a loading bar mean that time-consuming processing is now in progress. A yellow mark and an exclamation mark "!", and a beeping or bleeping sound being an alarm indicating that operation has not been accepted, a red mark indicating that an error has occurred, and a high, repeated peeping sound calling user's attention are now considered as typical mental models.

Due to the widespread use of mobile terminals such as smartphones and tablets, mental models in new forms of representations are being rapidly widespread. For example, a pencil-like icon appended to text means that the text is editable. A gear icon means that settings can be changed.

On the other hand, "the object of processing" is linked to a function provided by the information processing device 100, and the user is unlikely to have existing mental models. When executing processing, the user is required to give an instruction to execute this processing, and thus, a mode linked to this processing is provided to the user on a screen. The mode linked to processing may be an icon related to an application based on a one-to-one correspondence, a color defined specially for an application, or glyphs representing parameters for specifying the content of processing of an application. Before executing processing, the user sees such a mode. When providing information about "the state of processing", the mode concerning an application, which is "the object of processing", is displayed together with "the state of processing". This enables the user to instantly understand which application has started to execute the intended processing. Although it may take some time to memorize a mode concerning the object of processing, the user sees this mode every time the user executes the processing. Mental models concerning the information processing device 100 are constructed in this manner.

Information about "the requester of processing" (a user given an instruction to execute processing) may be displayed as an avatar icon or a background color specified by an individual user. Alternatively, "the requester of processing" may be represented in different colors by roles such as "administrator", "general user", "guest", and "customer engineer", and a pseudo user such as "system" indicating that the device has executed processing by itself. Although it may take some time for the user to learn such modes, the user can instantly understand them once the user has learned. "The requester of processing" may be represented by "me", "another user", or "system", or by "local user" started processing by using a panel of the information processing device 100 or "remote user" externally started processing.

An informing screen is created by a combination of user's existing mental models and a representing mode concerning "the object of processing" or "the requester of processing". The representing mode is presented consistently for the user when the user operates the information processing device 100 so that the user can naturally acquire mental models. Then, the user learns to instantly understand that a given piece of information "state of processing" is information related to "the object of processing" or "the requester of processing".

The operation receiving module 105 is connected to the processing module 110, the processing object detecting module 120, and the processing state detecting module 125. The operation receiving module 105 receives a user operation performed on the information processing device 100. For example, the operation receiving module 105 may receive a user operation by controlling a liquid crystal display, which also serves as a touch panel. The operation receiving module 105 may receive user operations (including eye gaze, gesture, and voice) performed by using a mouse, a keyboard, a camera, and a microphone. The operation receiving module 105 may receive an instruction from a terminal (for example, a user terminal 210, which will be discussed later) connected to the information processing device 100 via a communication line.

The processing module 110 is connected to the operation receiving module 105 and the processing state detecting module 125. The processing module 110 executes processing concerning a function of the information processing device 100. If the information processing device 100 is a multifunction device, for example, it provides functions concerning document conversion such as copying, fax sending and receiving, scanning, scanning and email sending, and scanning and storing a scanned document in a specified location. The information processing device 100 may instruct a device (for example, a processing server which will be discussed later) connected to the information processing device 100 via a communication line to execute processing.

The user login module 115 is connected to the requester detecting module 130. The user login module 115 verifies whether a user has registered in the information processing device 100 or in services (including the functions provided by the exemplary embodiment) provided by the information processing device 100. In other words, the user login module 115 performs login processing. The user login module 115 may verify user identification (ID) and a password input by the user against a user ID and a password registered in advance. Alternatively, the user login, module 115 may read a user's integrated circuit (IC) card by using an IC card reader to verify information stored in the IC card, or may conduct biometrics authentication using fingerprints, for example. The user login module 115 may authenticate a user using a terminal (for example, the user terminal 210, which will be discussed later) connected to the information processing device 100 via a communication line. As a result of the user login module 115 conducting authentication, the requester of processing is found.

The processing object detecting module 120 is connected to the operation receiving module 105 and the informing mode A decision module 135. The processing object detecting module 120 detects the object of processing (processing specified by the user) from the operation received by the operation receiving module 105.

The processing state detecting module 125 is connected to the operation receiving module 105, the processing module 110, and the informing mode B decision module 140. The processing state detecting module 125 detects the state of processing corresponding to the operation received by the operation receiving module 105, based on the processing executed by the processing module 110. Examples of the state are "in progress", "waiting", "an error occurred", and "customizing".

The requester detecting module 130 is connected to the user login module 115 and the informing mode C decision module 145. The requester detecting module 130 detects a user (requester of processing) performed the operation received by the operation receiving module 105, based on the result of authentication conducted by the user login module 115.

The informing mode A decision module 135 is connected to the processing object detecting module 120 and the informing module 150.

The informing mode B decision module 140 is connected to the processing state detecting module 125 and the informing module 150.

The informing mode C decision module 145 is connected to the requester detecting module 130 and the informing module 150.

The informing module 150 is connected to the informing mode A decision module 135, the informing mode B decision module 140, and the informing mode C decision module 145. The informing module 150 informs a user of the state of processing, the object of processing, and the requester of processing. More specifically, the informing module 150 displays these items of information on a display, such as the above-described touch panel. Alternatively, the informing module 150 may provide a message to a user by voice output using a speaker or by a tactile sensation using a haptic device.

The informing mode A decision module 135, the informing mode B decision module 140, the informing mode C decision module 145, and the informing module 150 have the following functions.

As a combination of the informing mode B decision module 140, the informing mode A decision module 135, and the informing module 150, the following functions are provided.

The informing mode B decision module 140 decides a first informing mode for informing a user of the state of processing by using a first attribute. The first attribute forms elements.

The informing mode A decision module 135 decides a second informing mode for informing a user of the object of this processing by using, among the elements, a second attribute, which is different from the first attribute used in the first informing mode.

The informing module 150 informs a user of the state of processing in the first informing mode and the object of this processing in the second informing mode at the same time. The first informing mode is a mode for providing information by using a first attribute which forms elements. The second informing mode is a mode for providing information by using, among the elements, a second attribute, which is different from the first attribute used in the first informing mode.

Elements are external factors (stimuli) perceivable by a human, for example, light, sound, and vibration. Examples of light visually perceivable by a human are, not only characters, drawings, and symbols, but also configurations, patterns, colors, and a dynamic change thereof (such as flash and animated graphics), blinking (the states or objects of processing may be distinguished from each other according to whether blinking is performed, the period for which blinking continues, or the interval of blinking), and a combination thereof. Configurations include two-dimensional configurations and three-dimensional configurations (including three-dimensional virtual configurations). An example of a combination of the above-described elements is graphics as a combination of a color and a configuration (or a pattern). Elements thus include graphics. The element will be explained below by taking a color as an example. The color may be combined with characters, drawings, sound, and vibration.

Examples of attributes which form elements are the three attributes of color (hue, lightness, and saturation) in the case of a color, the three attributes of sound (loudness (strength), pitch, and quality (tone)) in the case of sound, and a character attribute, such as a font, in the case of characters. The attribute will be explained below by taking a color set which defines the three attributes of color and is constituted by multiple colors as an example.

The informing mode is a concrete form of an attribute which forms an element, and corresponds to an instance in the so-called object-oriented concepts. In the case of "informing a user of the state of processing in a first informing mode", the user perceiving the first informing mode can understand the state of processing. In the case of "informing a user of the object of processing in a second informing mode", the user perceiving the second informing mode can understand the object of processing. That is, "a certain first informing mode" and "a certain state of processing" are associated with each other, and "a certain second informing mode" and "a certain object of processing" are associated with each other. In the case of "informing a user of the state of processing in a first informing mode and the object of this processing in a second informing mode at the same time", the user perceiving the first informing mode and the second informing mode can understand the state and the object of processing. Deciding an informing mode using a color, for example, refers to selecting one color set from among preset multiple color sets.

"Using an attribute different from a certain attribute" means that these two attributes are different. "Using an attribute different from a certain attribute" may include a case in which the two attributes are not exactly the same or may include a case in which the difference between the two attributes is equal to or greater than a predetermined threshold. If the difference between the two attributes is equal to or smaller than a predetermined threshold, they may be regarded as the same attribute. For example, depending on the threshold, blue and indigo may be treated as the same attribute (they are not different attributes) or as different attributes. The threshold may be determined for color blindness, for example. Determining a red-spectrum color set as a first attribute and a blue-spectrum color set as a second attribute corresponds to using different attributes.

"Providing two items of information at the same time" includes the meanings of "blending" and "superposing" of these two items of information. In the case of blending, two items of information, such as a first informing mode and a second informing mode, may be displayed on the same display. In the case of superposing, a second informing mode may be drawn and superposed in a translucent color on a first informing mode.

The informing mode A decision module 135 may set a second attribute used in a second informing mode. When setting the second attribute, the informing mode A decision module 135 may exclude a first attribute that has been set and display candidates for the second attribute.

As a combination of the informing mode B decision module 140, the informing mode C decision module 145, and the informing module 150, the following functions are provided.

The informing mode B decision module 140 decides a first informing mode for informing a user of the state of processing by using a first attribute which forms elements.

The informing mode C decision module 145 decides a third informing mode for informing a user of the requester of this processing by using, among the elements, a third attribute, which is different from the first attribute used in the first informing mode.

The informing module 150 may inform a user of the state of processing in the first informing mode and the requester of this processing in the third informing mode at the same time. The first informing mode is a mode for providing information by using a first attribute which forms elements. The third informing mode is a mode for providing information by using, among the elements, a third attribute, which is different from the first attribute used in the first informing mode.

In the case of "informing a user of the requester of processing in a third informing mode", the user perceiving the third informing mode can understand the requester of processing. That is, "a certain third informing mode" and "information indicating a certain requester of processing" are associated with each other. In the case of "informing a user of the state of processing in a first informing mode and the requester of this processing in a third informing mode at the same time", the user perceiving the first informing mode and the third informing mode can understand the state and the requester of the processing. Determining a red-spectrum color set as the first attribute and a green-spectrum color set as the third attribute corresponds to "using different attributes".

The informing mode C decision module 145 may set a third attribute used in a third informing mode. When setting the third attribute, the informing mode C decision module 145 may exclude a first attribute that has been set and display candidates for the third attribute.

As a combination of the informing mode A decision module 135, the informing mode C decision module 145, and the informing module 150, the following functions are provided.

The informing mode A decision module 125 may decide a second informing mode for informing a user of the object of processing by using a second attribute which forms elements.

The informing mode C decision module 145 may decide a third informing mode for informing a user of the requestor of this processing by using, among the elements, a third attribute, which is different from the second attribute used in the second informing mode.

The informing module 150 may inform a user of the object of processing in the second informing mode and the requester of this processing in the third informing mode at the same time. The second informing mode is a mode for providing information by using a second attribute which forms elements. The third informing mode is a mode for providing information by using, among the elements, third attribute, which is different from the second attribute used in the second informing mode.

The informing mode C decision module 145 may set a third attribute used in a third informing mode. When setting the third attribute, the informing mode C decision module 145 may exclude a second attribute that has been set and display candidates for the third attribute.

As a combination of the informing mode B decision module 140, the informing mode A decision module 135, the informing mode C decision module 145, and the informing module 150, the following functions are provided.

The informing mode B decision module 140 may decide a first informing mode for informing a user of the state of processing by using a first attribute which forms elements.

The informing mode A decision module 135 may decide a second informing mode for informing a user of the object of this processing by using, among the elements, a second attribute, which is different from the first attribute used in the first informing mode.

The informing mode C decision module 145 may decide a third informing mode for informing a user of the requestor of this processing by using, among the elements, a third attribute, which is different from the first attribute used in the first informing mode and the second attribute used in the second informing mode.

The informing module 150 may inform a user of the state of processing in the first informing mode, the object of this processing in the second informing mode, and the requester of this processing in the third informing mode at the same time. The first informing mode is a mode for providing information by using a first attribute which forms elements. The second informing mode is a mode for providing information by using, among the elements, a second attribute, which is different from the first attribute used in the first informing mode. The third informing mode is a mode for providing information by using, among the elements, a third attribute, which is different from the first attribute used in the first informing mode and the second attribute used in the second informing mode.

The informing mode A decision module 135 may set a second attribute used in a second informing mode. When setting the second attribute, the informing mode A decision module 135 may exclude a first attribute that has been set and display candidates for the second attribute.

The informing mode C decision module 145 may set a third attribute used in a third informing mode. When setting the third attribute, the informing mode C decision module 145 may exclude first and second attributes that have been set and display candidates for the third attribute.

Figure 2:
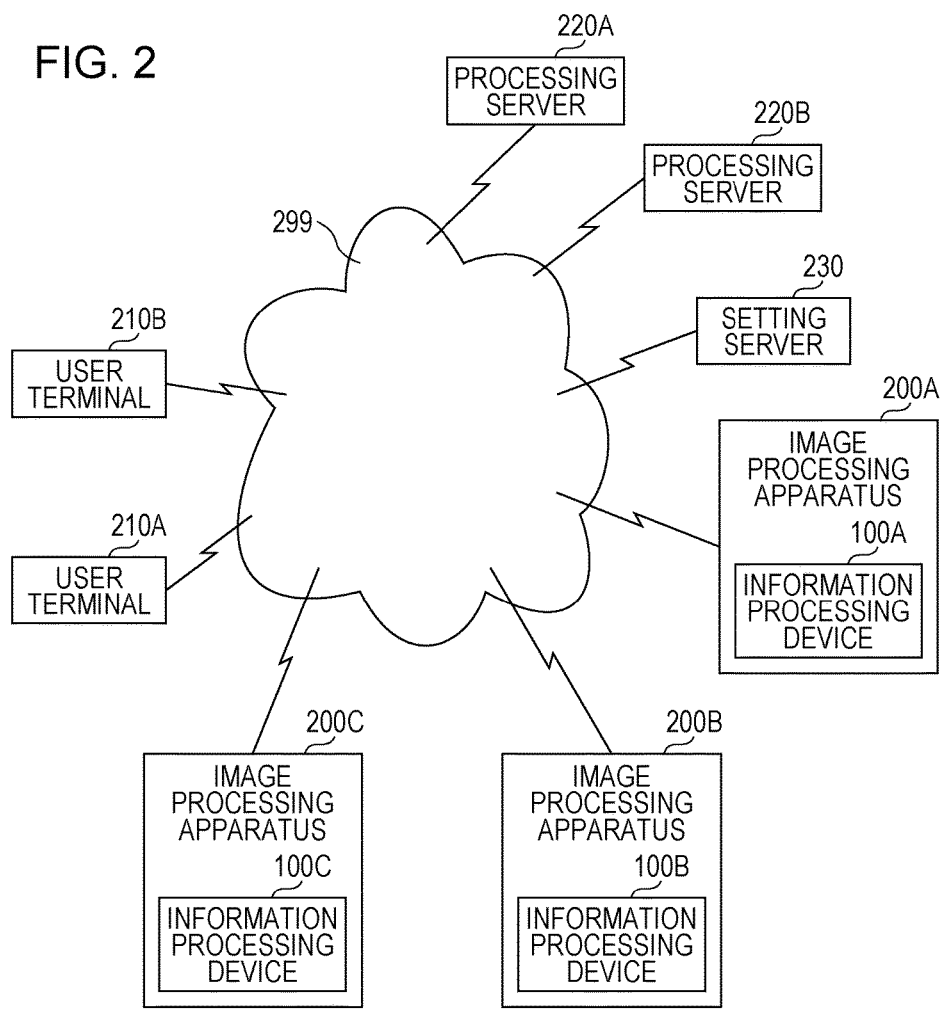
FIG. 2 is a block diagram illustrating an example of the configuration of a system utilizing the exemplary embodiment.

FIG. 2 is a block diagram illustrating an example of the configuration of a system utilizing the exemplary embodiment.

Image processing apparatuses 200A, 200B, and 200C, user terminals 210A and 210B, processing servers 220A and 220B, and a setting server 230 are connected to one another via a communication line 299. The communication line 299 may be a wireless or wired medium, or a combination thereof, and may be, for example, the Internet or an intranet as a communication infrastructure. Hereinafter, the image processing apparatuses 200A, 200B, and 200C will simply be called the image processing apparatus 200 or the image processing apparatuses 200 unless it is necessary to distinguish them from each other. Hereinafter, the user terminals 210A and 210B will simply be called the user terminal 210 or the user terminals 210 unless it is necessary to distinguish them from each other. Hereinafter, the processing servers 220A and 220B will simply be called the processing server 220 or the processing servers 220 unless it is necessary to distinguish them from each other. The functions of the processing server 220 may be implemented as cloud services. The image processing apparatuses 200A, 200B, and 200C respectively include information processing devices 100A, 100B, and 100C. The image processing apparatus 200 is the above-described multifunction device, for example. The image processing apparatus 200 is operated directly by a user or receives a user operation from the user terminal 210. The image processing apparatus 200 may execute processing in response to a user operation or may request the processing server 220 to execute processing (character recognition processing, for example) and receive a processing result. The image processing apparatus 200 may set an informing mode in response to a user operation or in response to an instruction from the setting server 230. The setting server 230 provides instructions to the plural image processing apparatuses 200, so that informing modes can be set consistently in the plural image processing apparatuses 200.

Figure 3:
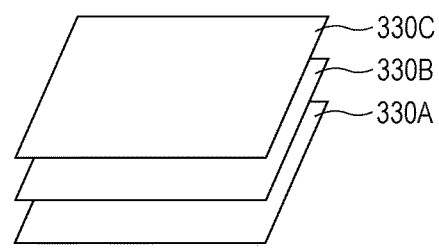
FIG. 3 is a view for explaining examples of informing modes in the exemplary embodiment.

FIG. 3 is a view for explaining examples of the informing modes in the exemplary embodiment.

The informing module 150 provides information by using three layers (layers 330A, 330B, and 330C), for example. The informing module 150 may present the object of processing on the layer 330C, the state of processing on the layer 330B, and information indicating the requester of processing on the layer 330A. Translucent processing may be performed on the layers 330C and 330B, so that the display content on the layer 330A can be seen through. If color sets are used as informing modes, associating of the color sets with the individual layers 330A through 330C can independently control items of information displayed on the layers 330A through 330C.

Plural informing modes may be presented on the same layer (one layer). Such a modification is also included in "superposing". A specific example of this modification is that "a first informing mode" and "a second informing mode" are displayed on the same layer.

Data used by the information processing device 100 will be described below by using a processing information table 400, a color set table 500, and a color-set association table 600.

FIG. 4 illustrates an example of the data structure of the processing information table 400.

The processing information table 400 includes a processing ID field 405, a requester field 410, a processing object field 415, an instruction received date field 420, a processing start date field 425, a number-of-parameter field 430, a parameter 1 field 435, a processing status field 490, and a processing end date field 495.

In the processing ID field 405, information (processing ID) for uniquely identifying processing in the exemplary embodiment is stored. In the requester field 410, a requester (user ID, for example) is stored. The requester in the requester field 410 is used for providing information indicating the requester of processing. In the processing object field 415, the object of processing (the type of processing, such as copying and scanning) is stored. The object of processing in the processing object field 415 is used for providing information concerning the object of processing. In the instruction received date field 420, a date on which an instruction is received (year, month, day, hour, minute, second, millisecond, or a combination thereof) is stored. In the processing start date field 425, the date on which processing is started in response to this instruction is stored. In the number-of-parameter field 430, the number of parameters necessary for executing this processing is stored. The number-of-parameter field 430 is followed by as many parameter 1 fields 435 as the parameters. In the parameter 1 field 435, the parameter 1 used in the processing is stored. In the processing status field 490, the status in the processing (the state of processing) is stored. Information in the processing status field 490 changes in accordance with the progress of processing. The status in the processing status field 490 is used for providing information concerning the state of processing. In the processing end date field 495, the date on which processing is completed is stored.

Each application has a color set which represents this application. The color set is also called a theme. The theme is a set of colors including a main color and some associated colors, such as a foreground color, a shade color, and a highlight color, which are determined by considering the balance with the main color and the visibility.

On an application basic screen, the theme of the application is presented to a user so that the main color of this application can stand out. The themes of the individual applications are presented to the user with some consistencies for all the applications. The main color is a dominant color in a color set and the other colors in the color set are derivative colors from the main color. For example, if the main color is red, the other colors are colors converted from red, such as deep red (dark red) and pale red (light red), so that the user can recall red from the other colors. The user recognizing a derivative color, such as dark red, can immediately recall the main color and understand that the main color is a color associated with the application. For example, if a color set including blue as the main color is used for a copying function, the user understands that blue represents an application for the copying function.

Icons of application buttons (see FIG. 8) for starting applications are also designed by using the main colors of themes.

The theme (the main color of the theme and an icon using the main color) of an application is a mode representing this application (the object of processing).

More specifically, when a color set is used as an informing mode, the color set table 500 is prepared. FIG. 5A illustrates an example of the data structure of the color set table 500. By selecting a color set, the informing mode can be decided.

The color set table 500 includes a color set ID field 505, an icon filed 510, and a color set field 515. The color set field 515 includes a main (single color) field 517, a main (texture pattern) field 519, a shade field 521, a highlight color field 523, and a character color field 525.

In the color set ID field 505, information (color set ID) for uniquely identifying a color set in the exemplary embodiment is stored. In the icon field 510, an icon using this color set is stored. In the color set field 515, the color set is stored. Five colors are defined in the color set field 515. Alternatively, a color set constituted by less than or more than five colors may be defined. In the main (single color) field 517, a first main color (single color) is stored. In the main (texture pattern) field 519, a color having the first main color in the background with a texture pattern is stored as a second main color. In the shade field 521, the shade corresponding to the main color is stored. In the highlight color field 523, the highlight color corresponding to the main color is stored. In the character color field 525, the color of characters in the main color, and more specifically, the color of characters having the main color in the background, for example, is stored.

Figure 5B:
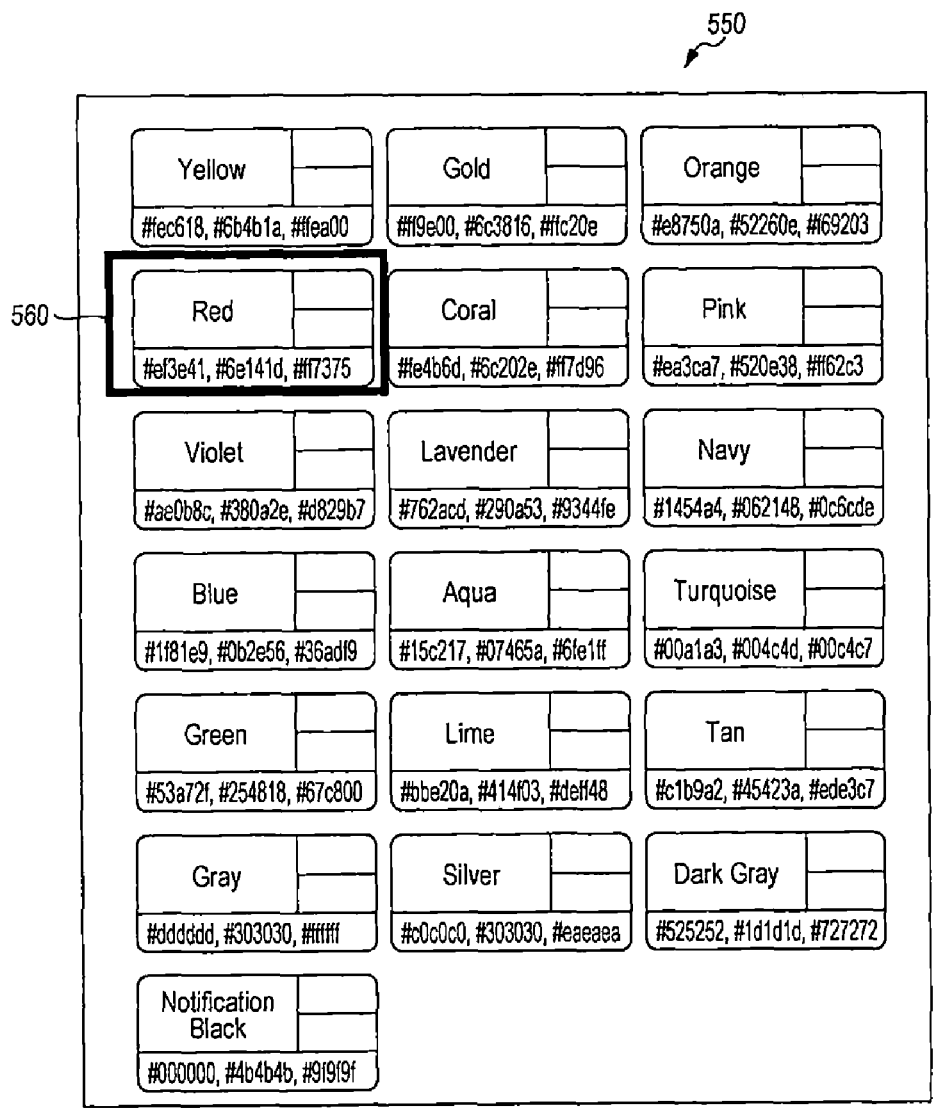
FIG. 5B illustrates an example of the relationship between a color palette and color sets.

FIG. 5B illustrates an example of the relationship between a color palette 550 and color sets 560. The color palette 550 is constituted by multiple color sets 560. Examples of the color sets 560 are a color set having yellow as the main color, a color set having gold as the main color, a color set having orange as the main color, and a color set having red as the main color. The color sets of yellow, red, dark gray, and black may be selected as first informing modes in advance, so that the other color sets can be selected as second informing modes.

Figure 6:
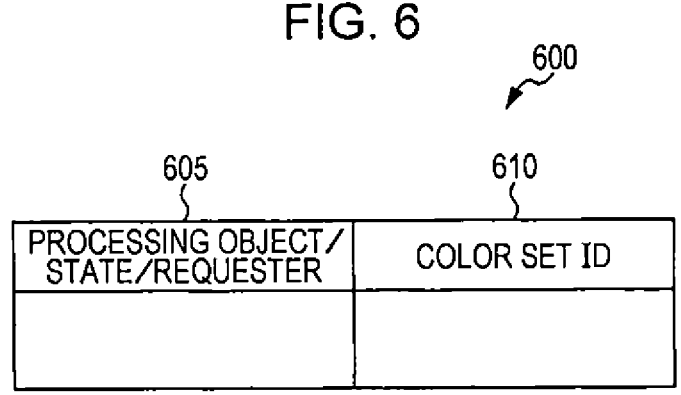
FIG. 6 illustrates an example of the data structure of a color-set association table.

FIG. 6 illustrates an example of the data structure of the color-set association table 600. By associating color sets with the object, the state, and the requester of processing, the informing modes can be decided for the object, the state, and the requester of the processing.

The color-set association table 600 includes a processing-object/state/requester field 605 and a color set ID field 610. In the processing-object/state/requester field 605, the object, the state, and the requester of processing are stored. In the color set ID field 610, color set IDs for the object, the state, and the requester of processing are stored.

Figure 7:
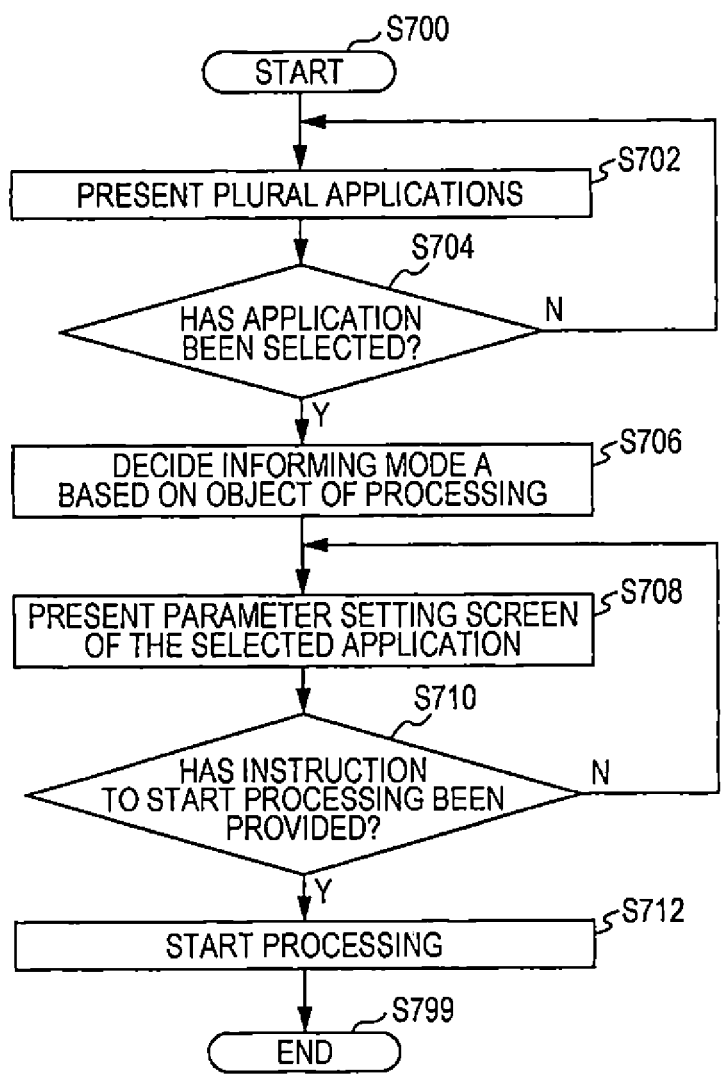
FIG. 7 is a flowchart illustrating an example of processing executed in the exemplary embodiment.

FIG. 7 is a flowchart illustrating an example of processing executed in the exemplary embodiment.

In step S702, plural applications provided by the information processing device 100 are presented. The information processing device 100 presents applications in forms that are easy to understand for a user, such as "copy app", "fax app" "email app", and "scan to USB app".

Figure 8:
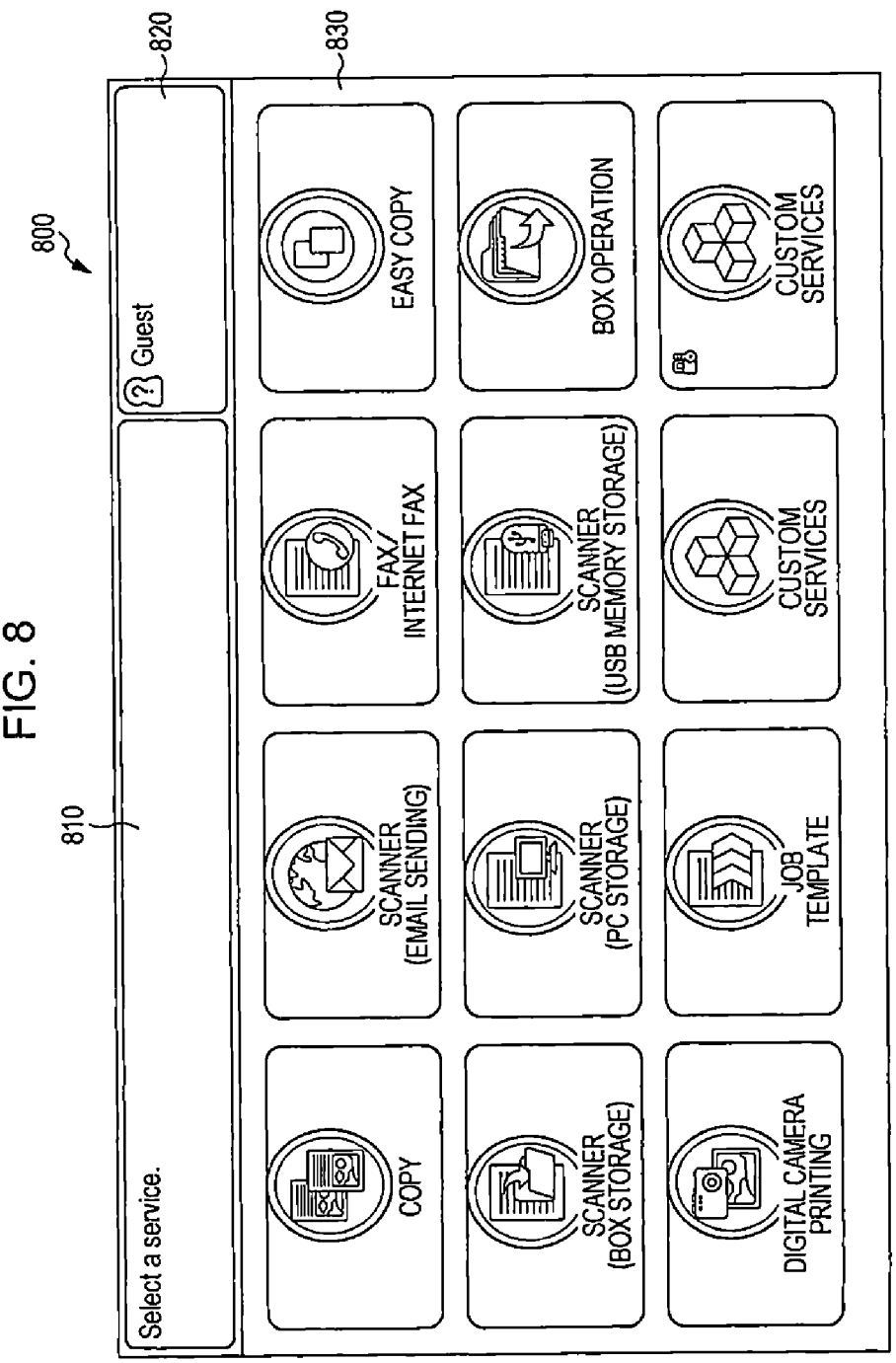
FIG. 8 is a view for explaining an example of processing in the exemplary embodiment.

On the home screen, the user presses a button for starting an application screen, and then, a corresponding application basic screen is opened. The home screen is a screen on which application buttons are arranged, such as that shown in FIG. 8. FIG. 8 is a view for explaining an example of processing in the exemplary embodiment. On a screen 800, a comment display field 810, a user presenting field 820, and an application icon presenting field 830 are displayed. In the application icon presenting field 830, icons representing functions such as copy, scanner (email sending), fax/Internet fax, easy copy, scanner (box storage), scanner (PC storage), scanner (USB memory storage), box operation, digital camera printing, job template, and custom services, for example, are presented.

In step S704, the operation receiving module 105 determines whether a user has selected an application. If an application has been selected, the process proceeds to step S706. If an application has not been selected, the process returns to step S702. As a result of the user selecting an icon of an application on the screen 800 shown in FIG. 8, for example, the basic screen of the application is opened.

In step S706, the informing mode A decision module 135 decides an informing mode A based on the object of processing.

Figure 9:
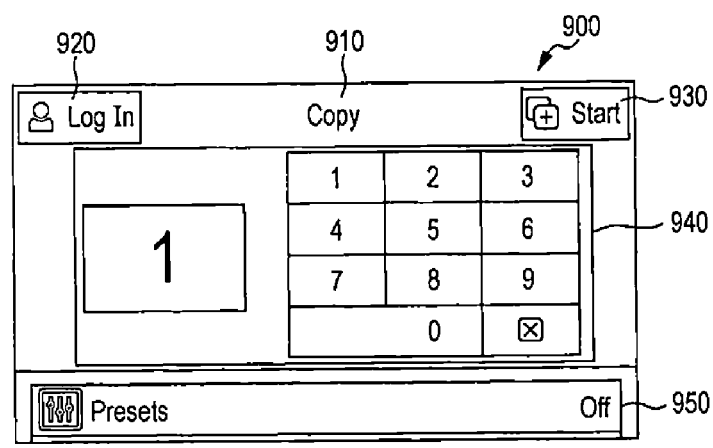
FIG. 9 is a view for explaining an example of processing in the exemplary embodiment.

In step S708, the informing module 150 presents a parameter setting screen for the selected application. As a result of the user pressing an application button on the home screen, the basic screen of this application is opened. If the copy icon is selected on the home screen shown in FIG. 8, the application basic screen shown in FIG. 9 is opened. FIG. 9 is a view for explaining an example of processing in the exemplary embodiment. On a screen 900, an application presenting field 910, a login button 920, a start button 930, a parameter setting (number of copies) field 940, and a parameter setting (other settings) field 950 are displayed. To set settings other than the number of copies, the parameter setting (other settings) field 950 is selected.

In step S710, the operation receiving module 105 determines whether a user has provided an instruction to start processing. If an instruction has been provided, the process proceeds to step S712. If an instruction has not been provided, the process returns to step S708. For example, on the application basic screen, the user sets a parameter setting (the number of copies in the example in FIG. 9) and then presses the start button 930 to provide an instruction to execute a (processing). The main color of the theme (color set) of the copy app is blue, and the inside within the screen 900 (in particular, the application presenting field 910, the login button 920, the start button 930, and the parameter setting (number of copies) field 940) shown in FIG. 9 is drawn by two colors of dark blue and pale blue. For each application, the upper portion of the basic screen (the application presenting field 910, the login button 920, the start button 930, and the parameter setting (number of copies) field 940) is displayed in a mode based on the main color of the theme. For example, if the main color of the theme of the email app is light orange, the upper portion of the email app basic screen is drawn by two colors of dark orange and yellow orange.

In step S712, the processing module 110 starts processing. The informing module 150 informs the user of the state of a job in execution so that the user can check the state of the job. More specifically, the informing module 150 informs the user of the state of processing when an error has occurred, processing has been completed, and a decision of the user is required, for example. Details of this processing will be discussed below with reference FIG. 10.

FIG. 10 is a flowchart illustrating an example of processing executed in the exemplary embodiment.

In step S1002, the processing state detecting module 125 determines whether there is a job in progress. If there is a job in progress, the process proceeds to step S1004. If there is no job in progress, the processing state detecting module 125 waits until a job has started.

In step S1004, the processing object detecting module 120 detects the object of processing.

In step S1006, the requester detecting module 130 detects the requester of processing.

In step S1008, the processing state detecting module 125 detects the state of processing.

In step S1010, the informing mode A decision module 135 decides an informing mode A based on the object of processing.

In step S1012, the informing mode C decision module 145 decides an informing mode C based on the requester of processing.

In step S1014, the informing mode B decision module 140 decides an informing mode B based on the state of processing.

In step S1016, the informing module 150 superposes the informing mode A, the informing mode B, and the informing mode C on each other and presents the superposed modes.

In step S1018, the processing state detecting module 125 determines whether there is another job in progress. If there is another job in progress, the process returns to step S1004.

If there is no job in progress, the processing state detecting module 125 quits the processing (step S1099).

Examples of the state of processing are:

the running state of an application program that starts processing (such as "not running", "active", and "background processing");

the parameter setting state for an application program that starts processing (setting initial values or changing some initial values) and the screen display state (a parameter settings screen is opened on the basic screen); and the state of processing started by using an application ("not yet started", "waiting (in the process of starting)", "waiting (waiting for another job to finish)", "in progress (such as reading, formatting, printing, and transferring)", "holding (such as waiting for a user to interrupt, waiting for recovering from a paper jam, and waiting for another job to finish)", and "completed (such as normal end, abnormal end, and canceled)".

Hereinafter, "the state of processing started by using an application" will principally be described.

When a job is started, a screen for providing information concerning the state of the job is usually displayed. If a job is started on a copy screen, it is apparent that information displayed on a screen indicates the processing state of a copy job. Immediately after the job is started, it may not be necessary to provide information concerning the object of processing "copy", and text information (copy) may be sufficient.

However, a job may be started in the following manner other than on an application screen:

starting a job by pressing a quick-start application button on a home screen, such as that in FIG. 8;

starting a job from a remote user interface (remote UI) connected to the information processing device 100 via a communication line;

starting a job by fax receiving or by a print or scan instruction from an external device connected to the information processing device 100 via a communication line;

starting a job at a preset time (started by the system) and starting maintenance processing by a maintenance system connected to the information processing device 100 via a network.

It may be necessary to inform a user of the state of processing, not only when a job is started, but also when the state of processing is changed.

The running state of an application may be included in the "the state of processing started by using an application". This information is necessary when the user conducts active task management. However, the user may not necessarily obtain this information.

"The state of processing started by using an application" will be explained below.

Figure 11A:
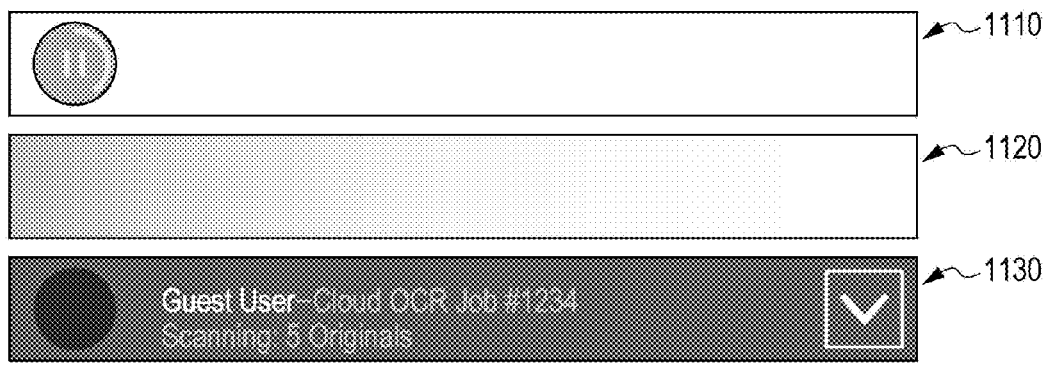
FIGS. 11A through 11C are views for explaining an example of processing in the exemplary embodiment.
Figure 11B:
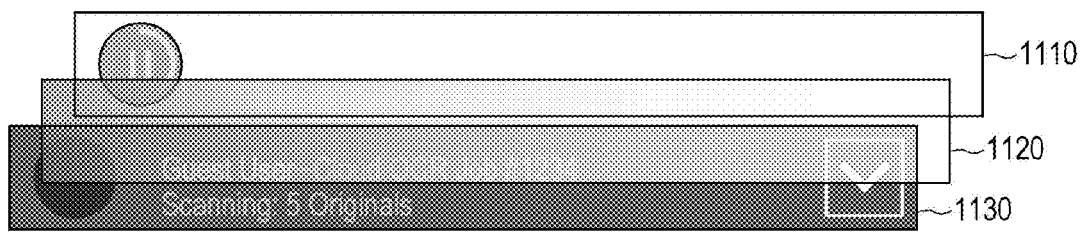
Figure 11C:
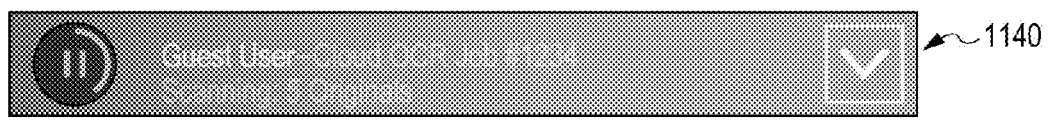

FIGS. 11A through 11C are views for explaining examples of processing in the exemplary embodiment. FIG. 11A illustrates an example in which information is provided by superposing layers 1110 and 1120 and a base layer 1130 on each other. The layer 1110 represents the progress state, and the layer 1120 represents an application. FIG. 11B illustrates an example in which the layers 1110 and 1120 and the base layer 1130 are superposed on each other. FIG. 11C illustrates a superposed image 1140 generated by superposing the layers 1110 and 1120 and the base layer 1130 on each other.

Figure 12:
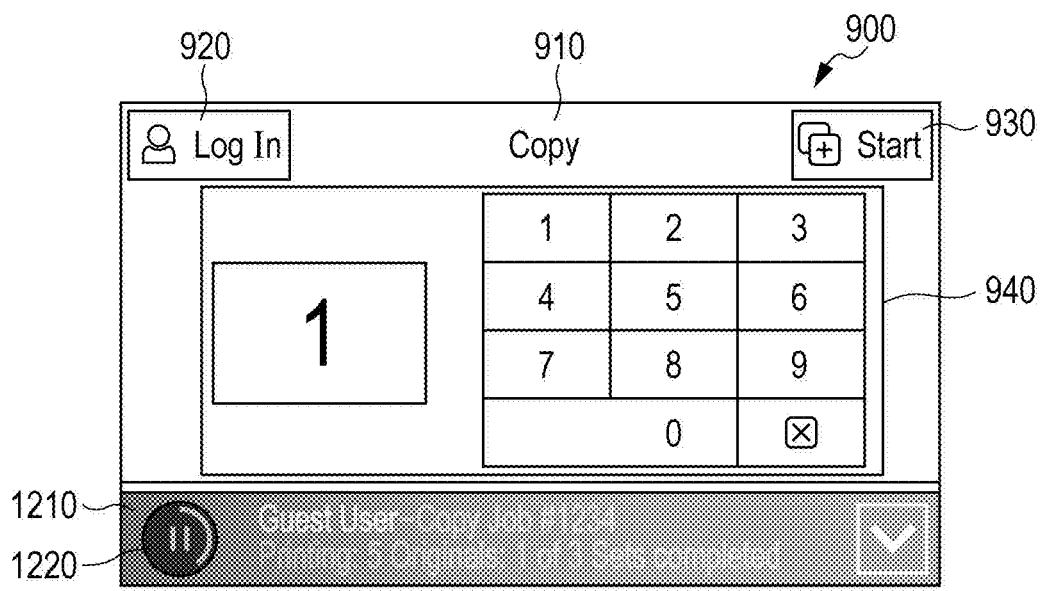
FIG. 12 is a view for explaining an example of processing in the exemplary embodiment.

FIG. 12 is a view for explaining an example of processing in the exemplary embodiment. On a screen 900, an application presenting field 910, a login button 920, a start button 930, a parameter setting (number of copies) field 940, and a state presenting field 1210 are displayed. That is, the screen 900 shown in FIG. 12 is a state after the start button 930 has been pressed on the screen 900 shown in FIG. 9. At the lower portion of the screen 900, the state presenting field 1210 is displayed. A processing-status animated image 1220 indicating that the processing is in progress is indicated on the left side in the state presenting field 1210. The state presenting field 1210 is generated by superposing the layer 1110 representing the progress state, the layer 1120 representing an application, and the base layer 1130 on each other.

Figure 13:
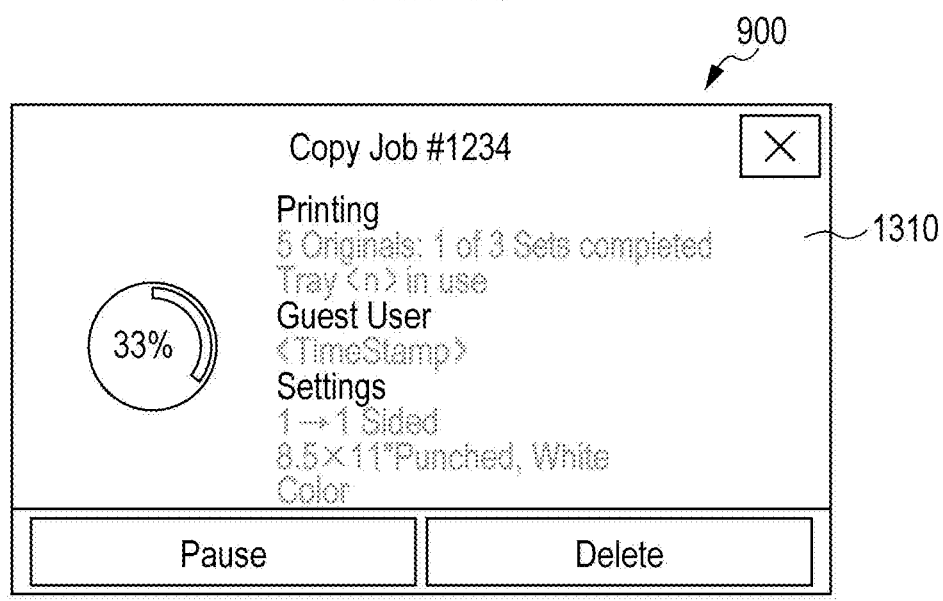
FIG. 13 is a view for explaining an example of processing in the exemplary embodiment.

When the user has selected (tapped) the state presenting field 1210, a screen 900 shown in FIG. 13 is displayed. FIG. 13 is a view for explaining an example of processing in the exemplary embodiment.

On the screen 900, a detailed state presenting region 1310 is displayed. In the detailed state presenting region 1310, the processing state of printing (33% completed), the requester (guest user), and settings (enlargement/reduction ratio, paper size, and paper color) are displayed.

A job state display button may be provided on the screen 800 shown in FIG. 8, and a list of job states may be displayed.

FIGS. 14A through 14F are views for explaining examples of processing in the exemplary embodiment.

FIG. 14A illustrates an example of information indicating the state of processing without a superposed color representing an application. The object of processing is less easy to recognize in the information shown in FIG. 14A than in information shown in FIGS. 14B through 14F. That is, unless the user recognizes the characters "Copy" in FIG. 14A, the user fails to understand that the object of processing is copy.

FIGS. 14B through 14F illustrate examples of information indicating the state of processing with a superposed color or icon representing an application.

FIG. 14B illustrates an example of information indicating the state of processing with a superposed blue copy icon (reduction copy) 1410. The information in FIG. 14B is easier to understand that the object of processing is copy than the information in FIG. 14A.

FIG. 14C illustrates an example of information indicating the state of processing with a superposed blue ring 1420 surrounding a processing-status animated image 1220, as indicated in the right section of FIG. 14C, on the left side in a state presenting field 1210c. The information in FIG. 14C is easier to understand that the object of processing is copy than the information in FIG. 14A.

FIG. 14D illustrates an example of information indicating the state of processing with a superposed copy representation layer 1430, which is a blue gradation, as indicated in the right section of FIG. 14D. The copy representation layer 1430 is similar to the layer 1120 representing an application, except that it is a blue gradation representing an application "copy". The information in FIG. 14D is easier to understand that the object of processing is copy than the information in FIG. 14A.

FIG. 14E illustrates an example of information indicating the state of processing with a superposed copy representation layer 1440 including blue copy representation regions 1444 and 1446 on the top and the bottom, as indicated in the right section of FIG. 14E. The height 1442 of the copy representation layer 1440 is the same as the height of a state presenting field 1210e. In the example in FIG. 14E, the information is displayed such that the blue copy representation regions 1444 and 1446 extend to outside the state presenting field 1210e. The information in FIG. 14E is easier to understand that the object of processing is copy than the information in FIG. 14A.

FIG. 14F illustrates an example of information indicating the state of processing with a blue copy icon 1450 placed under a processing-status animated image 1220, as indicated in the right section of FIG. 14F, on the left side in a state presenting field 1210f. The information in FIG. 14F is easier to understand that the object of processing is copy than the information in FIG. 14A. To indicate that the processing is in progress, the blue copy icon 1450 may be displayed as an animated image rotating or enlarging and reducing.

Figure 15A:
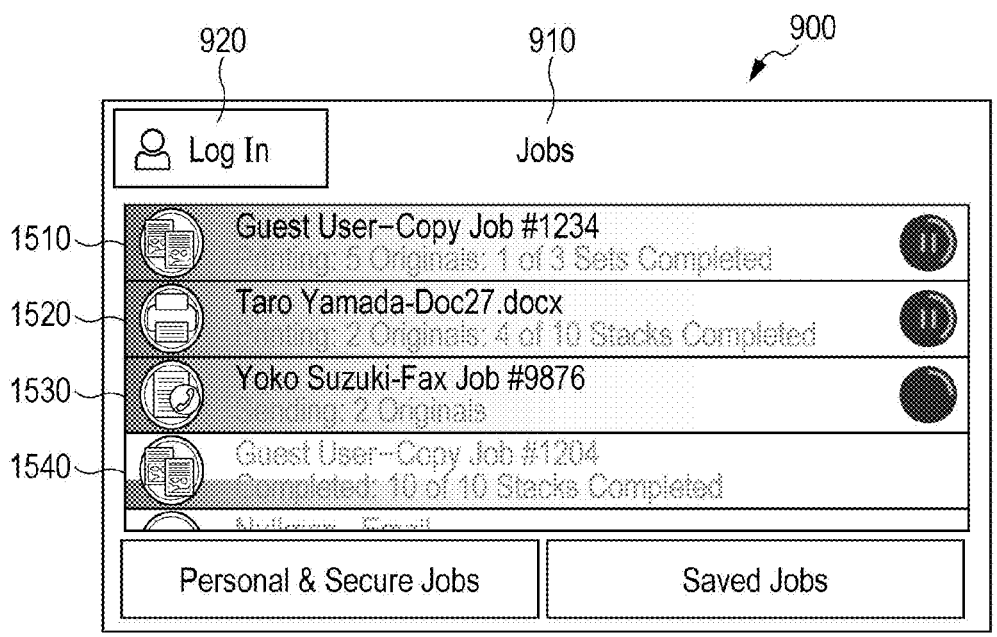
FIGS. 15A through 15C are views for explaining an example of processing in the exemplary embodiment.
Figure 15B:
Figure 15C:

FIGS. 15A through 15C are views for explaining an example of processing in the exemplary embodiment. In FIG. 15A, on a screen 900, an application presenting field 910, a login button 920, and state presenting fields 1510, 1520, 1530, and 1540 are displayed.

FIG. 15A illustrates a list of jobs. Plural states of processing are displayed on the screen 900, and it is necessary to clarify of which applications (objects of processing) the state of processing is displayed. Colors or icons representing applications are superposed on the states of processing.

Representations "in progress", "waiting", and "completed" are changed by processing-status animated images. Then, a gradation of a color representing an application is superposed on information concerning the state of processing. On the state presenting field 1510, a blue gradation application representation layer 1550 shown in FIG. 15B is superposed. On the state presenting field 1520, a purple gradation application representation layer 1550 shown in FIG. 15B is superposed. On the state presenting field 1530, a green gradation application representation layer 1550 shown in FIG. 15B is superposed. Under the state presenting field 1540, a blue gradation application representation layer 1560 shown in FIG. 15C is placed. The height of the blue gradation application representation layer 1560 is lower than that of the state presenting field 1540, which means that processing has been completed.

FIGS. 16A through 16F are views for explaining examples of processing in the exemplary embodiment. The screens shown in FIGS. 16A through 16D are displayed in graphics in a consistent manner so that, upon the occurrence of an error, a user can understand in which processing of an application an error has occurred. In the examples in FIGS. 16A through 16D, only color gradations are superposed on information concerning the state of processing.

In the example in FIG. 16A, on a screen 900, an application presenting field 1610a, a detailed state presenting field 1620a, and a state presenting icon (copying) 1630a are displayed. On the application presenting field 1610a, a blue application representation layer 1660 shown in FIG. 16E is superposed.

In the example in FIG. 16B, on a screen 900, an application presenting field 1610b, a detailed state presenting field 1620b, and a state presenting icon (fax sending) 1630b are displayed. On the application presenting field 1610b, a green application representation layer 1670 shown in FIG. 16F is superposed.

In the example in FIG. 16C, on a screen 900, an application presenting field 1610c, a detailed state presenting field 1620c, and a state presenting icon (copy held) 1630c are displayed. On the application presenting field 1610c, the blue application representation layer 1660 shown in FIG. 16E is superposed.

In the example in FIG. 16D, on a screen 900, an application presenting field 1610d, a detailed state presenting field 1620d, and a state presenting icon (fax sending held)

1630*d* are displayed. On the application presenting field 1610*d*, the green application representation layer 1670 shown in FIG. 16F is superposed.

FIGS. 17A and 17B are views for explaining examples of processing in the exemplary embodiment. FIGS. 17A and 17B illustrate other examples of the state of processing shown in FIG. 16A. In the examples in FIGS. 17A and 17E, color gradations including icons are superposed on information concerning the state of processing.

In the example in FIG. 17A, on a screen 900, an application presenting field 1710*a*, a detailed state presenting field 1720*a*, a state presenting icon (copying) 1730*a*, and an application icon (copy) 1740*a* are displayed. Within the detailed state presenting field 1720*a*, the application icon (copy) 1740*a* having a blue gradation background is displayed under the state presenting icon (copying) 1730*a*.

In the example in FIG. 17B, on a screen 900, an application presenting field 1710*b*, a detailed state presenting field 1720*b*, a state presenting icon (copying) 1730*b*, and an application icon (copy) 1740*b* are displayed. Within the detailed state presenting field 1720*b*, the application icon (copy) 1740*b* having a blue gradation background is displayed under the state presenting icon (copying) 1730*b*. The blue gradation of the application icon (copy) 1740*b* is larger than that in the example in FIG. 17A.

Not only upon the occurrence of an error in processing, but also upon the occurrence of a paper jam or a shortage of consumables due to the execution of processing, a color or an icon representing an application which has started this processing may be displayed. However, this type of information may be provided in a limited manner, such as only when the user started this application is currently logging in. This will be discussed more specifically with reference to FIG. 18.

FIG. 18 a flowchart illustrating an example of processing executed in the exemplary embodiment.

In step S1802, the processing state detecting module 125 determines whether an error has been detected. If an error has been detected, the process proceeds to step S1804. If an error has not been detected, the processing state detecting module 125 waits until an error occurs.

In step S1804, the requester detecting module 130 detects a currently logging user.

In step S1806, the requester detecting module 130 detects the requester of a job in which an error has occurred.

In step S1808, the requester detecting module 130 determines whether the currently logging user coincides with the requester of the job. If the user and the requester coincide with each other, the process proceeds to step S1810. If the user and the requester do not coincide with each other, the process proceeds to step S1812.

In step S1810, the informing module 150 displays the occurrence of an error.

In step S1812, the processing state detecting module 125 determines whether the occurrence of this error will interrupt the execution of a job of the logging user. If the occurrence of this error interrupts the execution of a job of the logging user, the process proceeds to step S1814. If the occurrence of this error does not interrupt the execution of a job of the logging user, the process proceeds to step S1816. The result of step S1812 becomes YES when the execution of a job of the logging user will be terminated or held because of this error. If the job of the logging user is making a copy, the occurrence of a paper jam while another user is printing interrupts the job of the logging user. In contrast, the result of step S1812 becomes NO when the execution of a job of the logging user will not be terminated or held. For example, if the job of the logging user is scanning, the occurrence of a paper jam while another user is printing does not interrupt the job of the logging user. In this case, the informing module 150 does not info the logging user of the occurrence of an error because the user is not responsible for handling such an error, and the processing module 110 continues the job.

In step S1814, the informing module 150 displays the occurrence of an error, together with the requester of the job in which the error has occurred. Then, the logging user performs error handling by itself or requests the requester of the job to perform error handling.

In step S1816, the informing module 150 does not display the occurrence of an error, and the processing module 110 continues executing the job of the logging user.

Figure 19A:
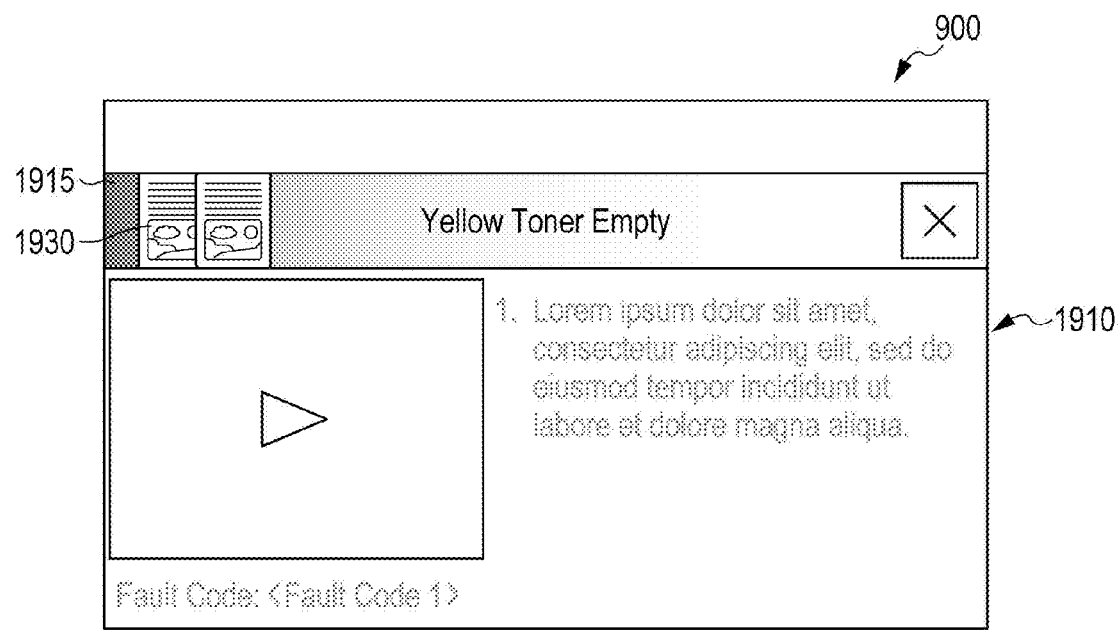
FIGS. 19A and 19B are views for explaining an example of processing in the exemplary embodiment.
Figure 19B:
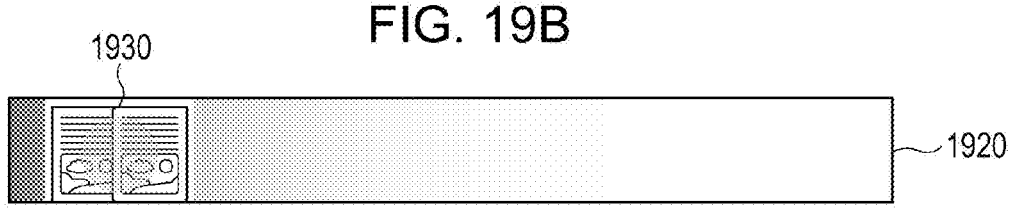

FIGS. 19A and 19B are views for explaining an example of processing in the exemplary embodiment, and more specifically, FIG. 19A illustrates a screen showing that consumables (yellow toner) are running out.

On a screen 900, a detailed error presenting region 1910 and an error title presenting region 1915 are displayed. On the error title presenting region 1915 having a red background, an application presenting layer 1920 shown in FIG. 19B is superposed. A blue copy icon 1930 is indicated on the left side in the application presenting layer 1920.

Allowing a user to immediately check an application that has started processing, together with information concerning the occurrence of an error, is effective particularly in executing a derivative application. The derivative application is an application derivatively created from a basic application provided by the information processing device 100. A workflow utilizing an application programming interface (API) provided by the information processing device 100 may also be included.

When creating a derivative application, the same color set of a basic application may be used in the derivative application, or a different color set may be used.

An application created by a user for processing a workflow may have a unique color set.

In the case of a workflow, time-consuming processing operations are executed sequentially or in parallel, and it may take time to execute each processing operation. Even if a user starting processing stays there, an operation regardless of the started processing may be executed or plural workflows may be operated simultaneously. Upon the occurrence of an error, the user is thus unable to understand in which workflow an error has occurred.

Figure 20:
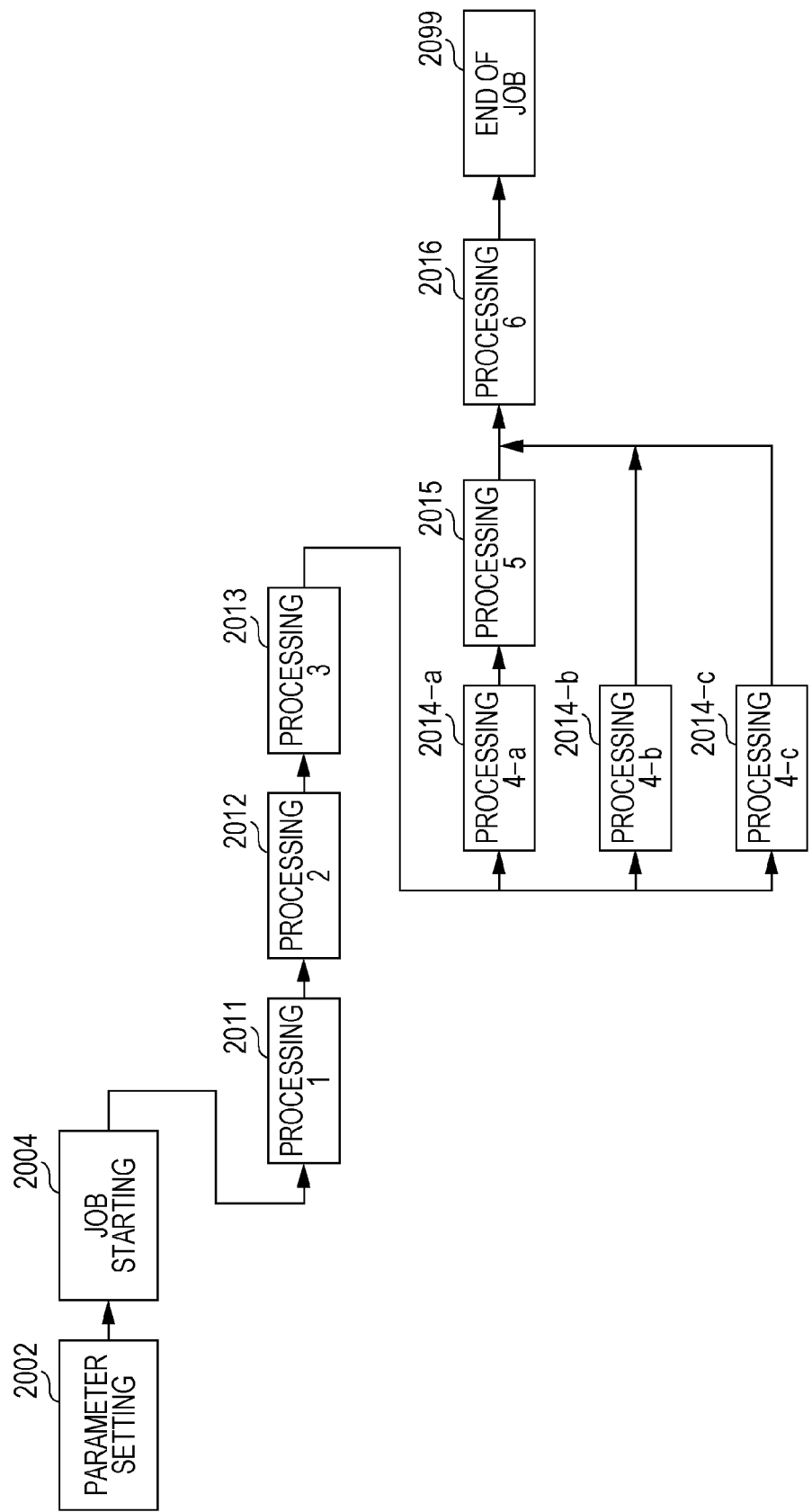
FIG. 20 illustrates an example of processing operations that may be executed in the exemplary embodiment.
Figure 21:
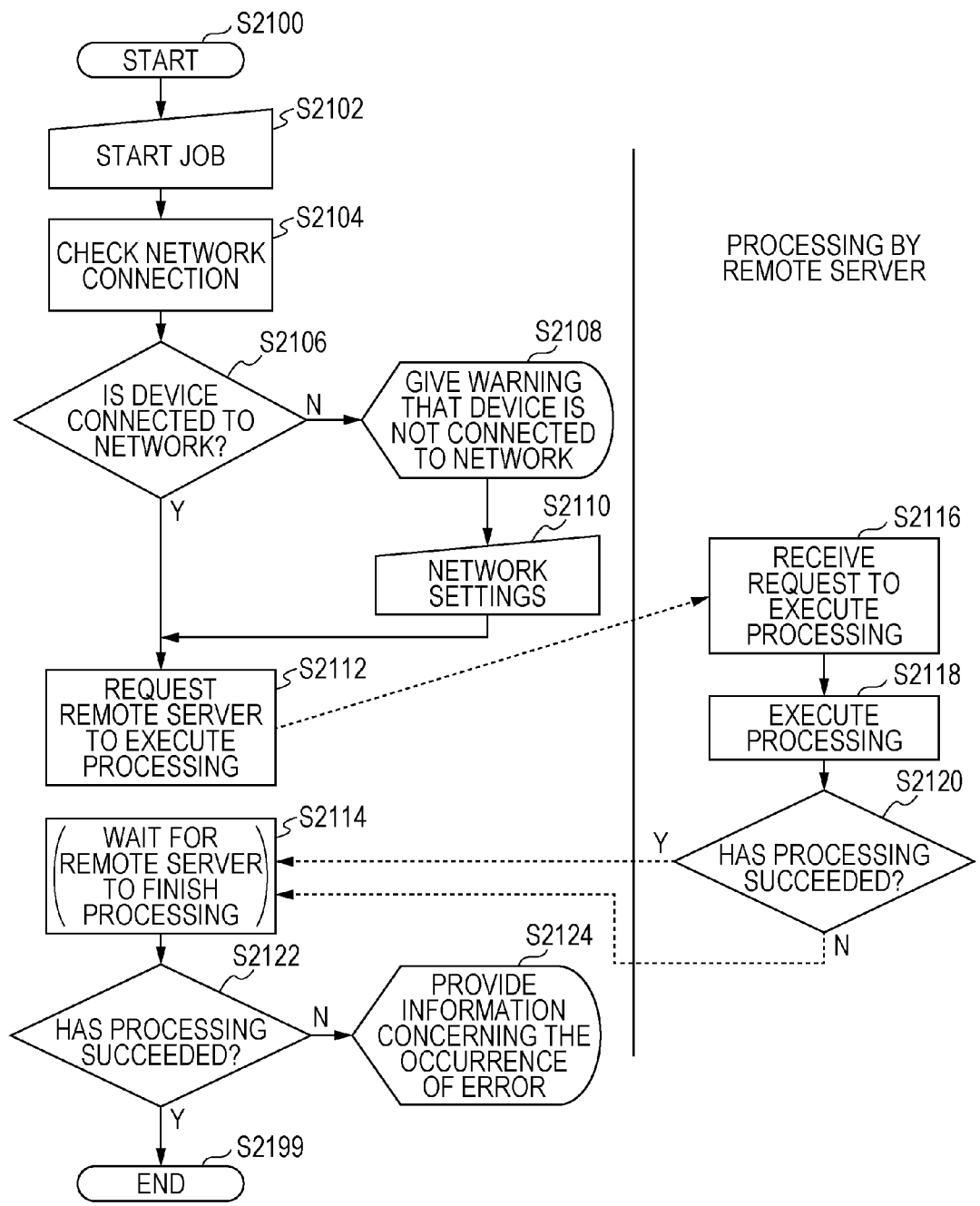
FIG. 21 is a flowchart illustrating an example of processing executed in the exemplary embodiment.

FIG. 20 is a block diagram illustrating a typical example of a workflow. FIG. 21 illustrates a specific example of a workflow.

FIG. 20 illustrates an example of processing operations that may be executed in the exemplary embodiment. This example shows a workflow of a combination of basic processing operations executable by the information processing device 100. This workflow will be explained more specifically. Parameter setting 2002, job starting 2004, processing 1 2011, processing 2 2012, and processing 3 2013 are sequentially executed. Then, processing 4-*a* 2014-*a*, processing 4-*b* 2014-*b*, and processing 4-*c* 2014-*c* are executed in parallel. Subsequent to the processing 4-*a* 2014-*a*, processing 5 2015 is executed, and then, after the completion of the processing 4-*b* 2014-*b* and the processing 4-*c* 2014-*c*, processing 6 2016 is executed. Then, the job has been completed (the end of job 2099).

FIG. 21 is a flowchart illustrating an example of processing executed in the exemplary embodiment. More specifically, FIG. 21 illustrates a specific example of workflow processing during which an error occurs.

In step S2102, a user starts a job.

In step S2104, the user checks network connection.

In step S2106, it is determined whether the device is connected to a network. If the device is connected to a network, the process proceeds to step S2112. If the device is not connected to a network, the process proceeds to step S2108.

In step S2108, a warning that the device is not connected to a network is provided.

In step S2110, the user sets network settings, and the process proceeds to step S2112.

In step S2112, the user requests the processing server 220 (remote server) to execute processing.

In step S2114, the user waits for processing to be completed.

In step S2116, the processing server 220 receives a request to execute processing.

In step S2118, the processing server 220 executes processing.

In step S2120, the processing server 220 determines whether processing has succeeded.

In step S2122, the user determines whether processing has succeeded. If processing has succeeded, the user quits processing (step S2199). If processing has not succeeded, the process proceeds to step S2124.

In step S2124, information concerning the occurrence of an error is provided.

Figure 22A:
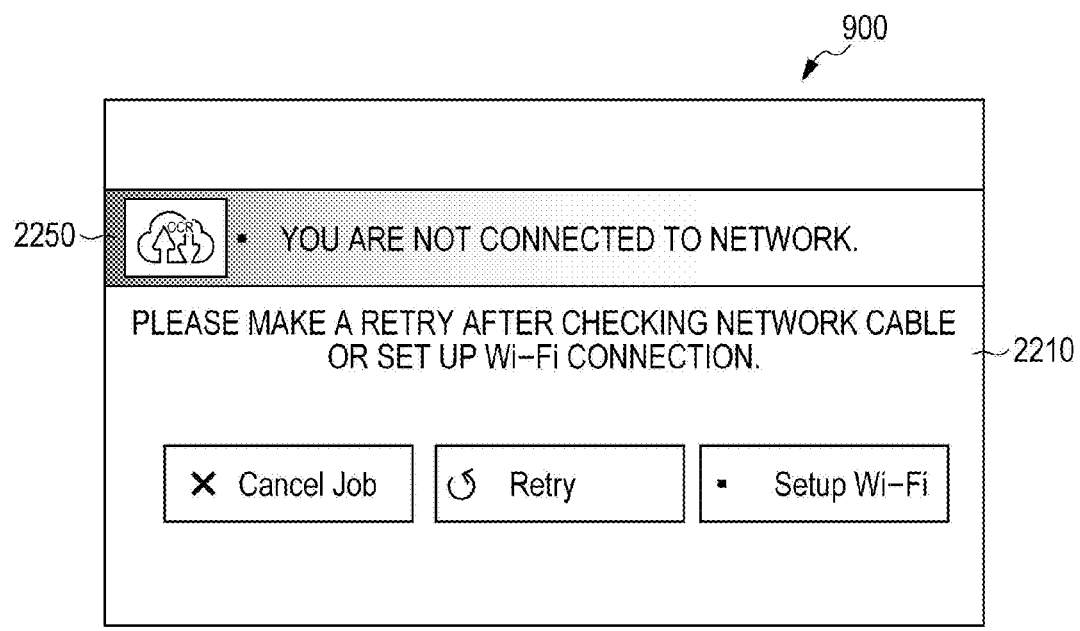
FIGS. 22A and 22E are views for explaining an example of processing in the exemplary embodiment.
Figure 22B:
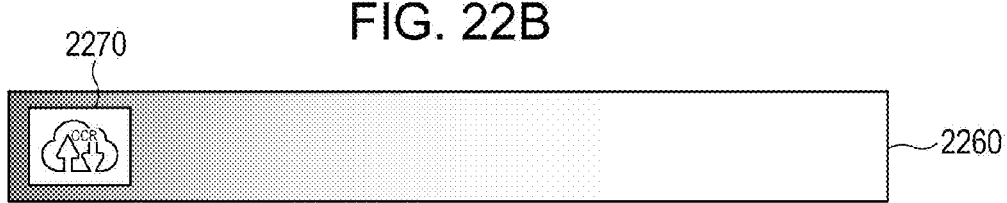

FIGS. 22A and 22B are views for explaining an example of processing in the exemplary embodiment. More specifically, FIG. 22A illustrates an example of information concerning the occurrence of an error while the information processing device 100 is executing processing by using the processing server 220A (server executing character recognition processing, for example) connecting to the communication line 299. Since character recognition processing is being executed by the processing server 220A, the information processing device 100 can execute another processing. Upon the occurrence of an error in character recognition processing while the information processing device 100 is executing another processing, information concerning the occurrence of an error is provided to the user, as shown in FIG. 22A, after the information processing device 100 has finished executing the processing.

In the example in FIG. 22A, on a screen 900, an error display region 2210 and an error title presenting region 2250 are displayed. On the error title presenting region 2250, an application representation layer 2260 shown in FIG. 22B is superposed. A pink cloud service icon 2270 is indicated on the left side in the application representation layer 2260, and a pink gradation is also provided in the application representation layer 2260.

Providing of information concerning the requester of processing will be discussed below.

Colors are assigned to the individual rolls of authenticated users. Information concerning the requester is displayed by itching the color of a login button. For example, black is for an unauthenticated user, green is for an authenticated general user, and orange is for a customer engineer.

Figure 23A:
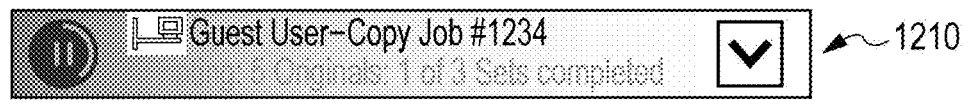
FIGS. 23A and 23B are views for explaining an example of processing in the exemplary embodiment.
Figure 23B:

When information concerning the authenticating state or the subject started processing is superposed on information concerning the state of processing, the screen such as that shown in FIG. 23A is displayed. That is, an application representation layer 2360 shown in FIG. 23B is superposed on a state presenting field 1210 shown in FIG. 23A. A purple remote service icon 2370 is indicated on the left side in the application representation layer 2360, and a purple gradation is also provided in the application representation layer 2360. This allows the user to recognize that this job has been started remotely.

A job started by using the information processing device 100 may be displayed in a different icon or color. Additional information may not be provided for a job started by the user of the information processing device 100.

This enables the user to understand that, when receiving information concerning the state of processing, the processing has been started externally. If the user judges that the priority of a job that the user is going to start is higher than the job started by a remote user, the user can execute its own job first by changing the priorities of the jobs or by holding the job of the remote user.

In a manner similar to restricting the access rights according to the roll, a feature representing each roll (an example of the third attribute used in the third informing mode) may be set. Specific examples are as follows.

An avatar (such as a photo and an icon) is set for each user.

Not only assigning preset rolls to users, the administrator of the information processing device 100 may also be able to add rolls or restrict the access rights according to the roll. In this case, when creating new rolls, the administrator of the information processing device 100 may set icons or graphics representing these rolls, as in the avatar in the user account. This allows a user to recognize which roll assigned to a user started processing.

The rolls may include "system" or "external maintenance".

Information concerning a roll is displayed in an eye-catching manner, together with the state of processing. In this manner, upon receiving information concerning the state of another processing while a user is executing its own job, the user can allow this processing to be executed. If the user assumes that it will take time to execute this processing, the user may execute its own job later. Conversely, the user may execute its own job first.

Figure 24A:
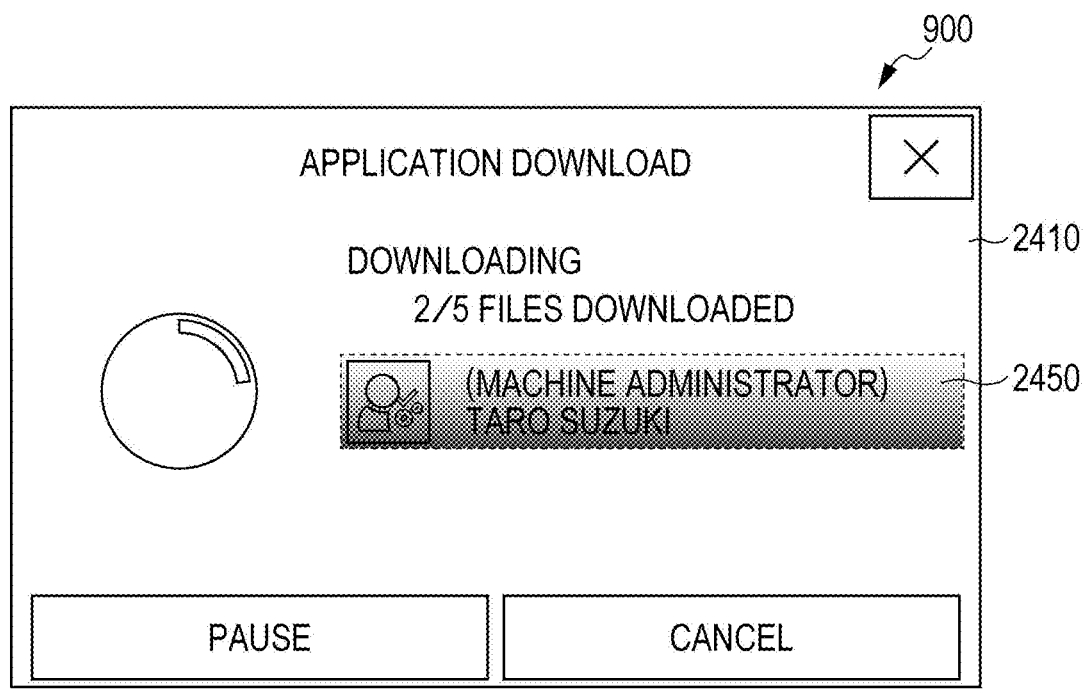
FIGS. 24A and 24B are views for explaining an example of processing in the exemplary embodiment.
Figure 24B:
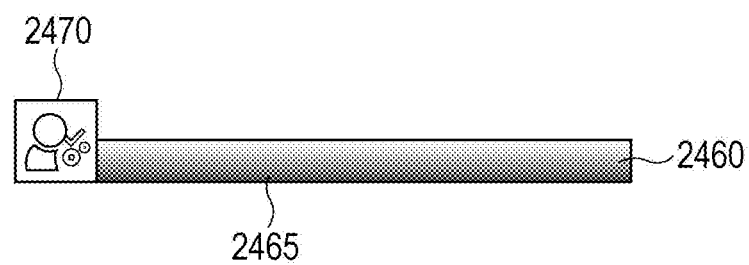

FIGS. 24A and 24B are views for explaining an example of processing in the exemplary embodiment. A user, which serves the roll of a machine administrator, provides an instruction to download an application by specifying the downloading start time. FIG. 24A shows an example of a screen on which this application is being downloaded.

The user provided this instruction may not be near the information processing device 100. However, another user seeing this screen recognizes the roll of the user and understands that this processing is legit late processing which should not be terminated.

In the example in FIG. 24A, on a screen 900, a detailed state presenting field 2410 and a requester presenting region 2450 are displayed. On the requester presenting region 2450, an application representation layer 2460 shown in FIG. 24B is superposed. A green application download icon 2470 is indicated on the left side in the application representation layer 2460, and a green application representation region 2465 is indicated in the lower portion of the application representation layer 2460.

As "the state of processing", an application customizing state will be explained below. On a customizing screen, the user can change the settings of an application according to the necessity. For example, the user can change the setting of the layout (arrangement) of the application.

Figure 25A:
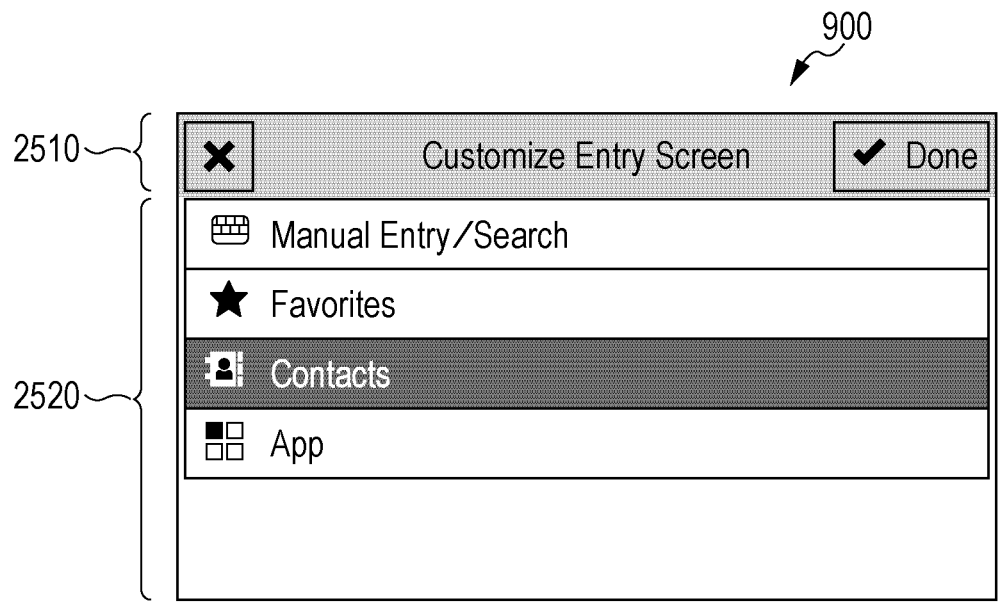
FIGS. 25A and 25B are views for explaining examples of processing in the exemplary embodiment.
Figure 25B:
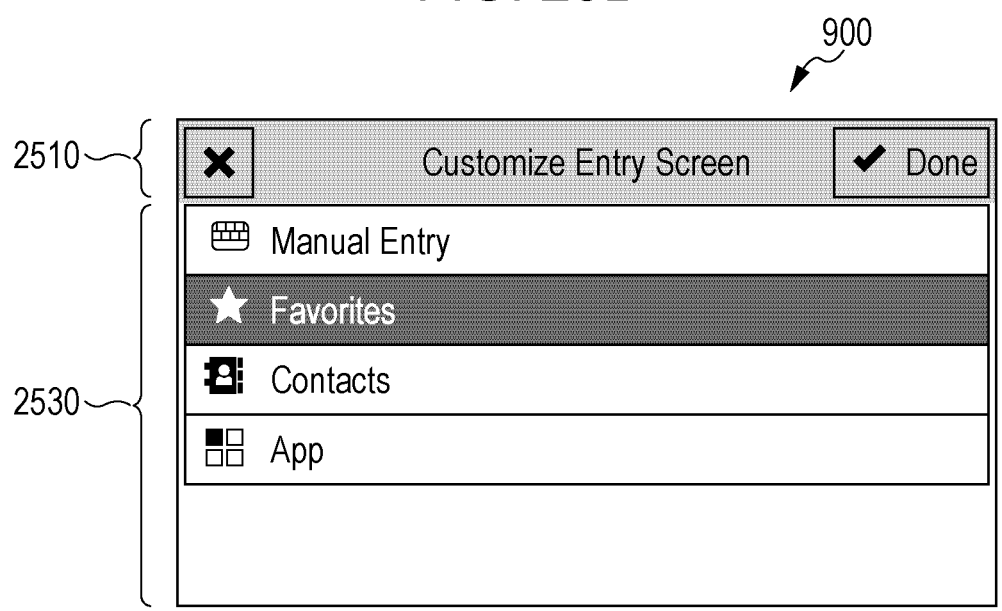

Customizing of the arrangement of display and the order of functions will be described by way of example. FIG. 25A illustrates a display example of the settings of the initial display screen in an email app. On a screen 900, a customize mode presenting field 2510 and initial display screen setting fields 2520 are displayed. A color set having yellow as the main color, which indicates that customizing is in progress, is used in the customize mode presenting field 2510. A color set having gold as the main color, which indicates that this app is an email app, is used in the initial display screen setting fields 2520. Examples of the initial display screen setting fields 2520 are "Manual Entry/Search", "Favorites", "Contacts", and "App". FIG. 25B illustrates a display example of the settings of the initial display screen in a fax app. On a screen 900, a customize mode presenting field 2510 and initial display screen setting fields 2530 are displayed. A color set having yellow as the main color, which indicates that customizing is in progress, is used in the customize mode presenting field 2510. A color set having green as the main color, which indicates that this app is a fax app, is used in the initial display screen setting fields 2530. Examples of the initial display screen setting fields 2530 are "Manual Entry", "Favorites", "Contacts", and "App".

An example of the hardware configuration of the information processing device 100 of this exemplary embodiment will be described below with reference to FIG. 26. The hardware configuration shown in FIG. 26 is implemented as a personal computer (PC), for example, and includes a data reader 2617, such as a scanner, and a data output unit 2618, such as a printer.

A CPU 2601 is a control unit that executes processing in accordance with a computer program describing an execution sequence of the modules of the above-described exemplary embodiment, that is, the operation receiving module 105, the processing module 110, the user login module 115, the processing object detecting module 120, the processing state detecting module 125, the requester detecting module 130, the informing mode A decision module 135, the informing mode B decision module 140, the informing mode C decision module 145, and the informing module 150.

A read only memory (ROM) 2602 stores therein programs and operation parameters used by the CPU 2601. A RAM 2603 stores therein programs used during the execution of the CPU 2601 and parameters which change appropriately during the execution of the programs. The CPU 2601, the ROM 2602, and the RAM 2603 are connected to one another via a host bus 2604, which is constituted by, for example, a CPU bus.

The host bus 2604 is connected to an external bus 2606, such as a peripheral component interconnect/interface (PCI) bus, via a bridge 2605.

A keyboard 2608 and a pointing device 2609, such as a mouse, are devices operated by an operator. A display 2610 is, for example, a liquid crystal display or a cathode ray tube (CRT), and displays various items of information as text or image information. Alternatively, a touch screen having both of the functions of the pointing device 2609 and the display 2610 may be provided.

A hard disk drive (HDD) 2611 has a built-in hard disk (may alternatively be a flash memory, for example) and drives the hard disk so as to record or play back information or programs executed by the CPU 2601. In the hard disk, the processing results of the individual modules and data in the processing information table 400, the color set table 500, and the color-set association table 600 are stored. Various other items of data and various other computer programs are also stored in the hard disk.

A drive 2612 reads data or a program recorded in a removable recording medium 2613, such as a magnetic disk, an optical disc, a magneto-optical disk, or a semiconductor memory, and supplies the read data or program to the RAM 2603 via an interface 2607, the external bus 2606, the bridge 2605, and the host bus 2604. The removable recording medium 2613 is also usable as a data recording region.

A connecting port 2614 is a port for connecting the PC to an external connecting device 2615, and has a connecting portion, such as a universal serial bus (USB) port or an IEEE1394 port. The connecting port 2614 is connected to, for example, the CPU 2601, via the interface 2607, the external bus 2606, the bridge 2605, and the host bus 2604. A communication unit 2616 is connected to a communication line and executes data communication processing with an external source. The data reader 2617 is, for example, a scanner, and executes processing for reading documents. The data output unit 2618 is, for example, a printer, and executes processing for outputting document data.

The hardware configuration of the information processing device shown in FIG. 26 is only an example, and the information processing device may be configured in any manner in which the modules described in the exemplary embodiment are executable. For example, some modules may be configured as dedicated hardware (for example, an application specific integrated circuit (ASIC)), or some modules may be installed in an external system and be connected to the information processing device 100 via a communication line. Alternatively, a system, such as that shown in FIG. 26, may be connected to a system, such as that shown FIG. 26, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, or a multifunction device.

The above-described program may be stored in a recording medium and be provided. The program recorded on a recording medium may be provided via a communication medium. In this case, the above-described program may be implemented as a "non-transitory computer readable medium storing the program therein" in the exemplary embodiment of the invention.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray(registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. Further, the program may be recorded in any form, for example, it may be compressed or encrypted in a manner such that it can be reconstructed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a memory storing a plurality of sets of attributes for different types of processing; and
   a processor programmed to
   provide information concerning a state of processing instructed by a user to be performed by the information processing device in a first informing mode and information concerning an object of the processing in a second informing mode at the same time, the object of the processing being an application to be executed in response to the instruction by the user, wherein
   the first informing mode is a mode for providing information by using a first attribute which forms elements,
   the second informing mode is a mode for providing information by using, among the elements, a second attribute, which is different from the first attribute used in the first informing mode,
   the processor selects a single set among the plurality of sets stored in the memory based on the processing instructed by the user, and the first and second attributes are determined by the selected single set,
   when the information processing device performs a first job using a first type of processing and a second job using a second type of processing, the processor displays a list of jobs including the first job and the second job, the first job being displayed in a first color scheme and the second job being displayed in a second color scheme different from the first color scheme, the first color scheme being the corresponding single set of the plurality of sets for the first type of processing, and the second color scheme being the corresponding single set of the plurality of sets for the second type of processing, and
   when an error occurs in the first job, the processor displays a message indicating the error, the message superimposing information indicating the first type of processing on a background color, the information indicating the first type of processing being displayed in a color of the first color scheme.

2. The information processing device according to claim 1, wherein the processor is further programmed to
   set the second attribute used in the second informing mode.

3. The information processing device according to claim 2, wherein, when setting the second attribute, the processor excludes the first attribute that has been set and displays candidates for the second attribute.

4. An information processing device comprising:
   a memory storing a plurality of sets of attributes for different types of processing; and
   a processor programmed to
   provide information concerning a state of processing instructed by a requester to be performed by the information processing device in a first informing mode and information concerning the requester of the processing in a third informing mode at the same time, wherein
   the first informing mode is a mode for providing information by using a first attribute which forms elements,
   the third informing mode is a mode for providing information by using, among the elements, a third attribute, which is different from the first attribute used in the first informing mode,
   the processor selects a single set among the plurality of sets stored in the memory based on the processing instructed by the requester, and the first and third attributes are determined by the selected single set,
   when the information processing device performs a first job using a first type of processing and a second job using a second type of processing, the processor displays a list of jobs including the first job and the second job, the first job being displayed in a first color scheme and the second job being displayed in a second color scheme different from the first color scheme, the first color scheme being the corresponding single set of the plurality of sets for the first type of processing, and the second color scheme being the corresponding single set of the plurality of sets for the second type of processing, and
   when an error occurs in the first job, the processor displays a message indicating the error, the message superimposing information indicating the first type of processing on a background color, the information indicating the first type of processing being displayed in a color of the first color scheme.

5. The information processing device according to claim 4, wherein the processor is further programmed to
   set the third attribute used in the third informing mode.

6. The information processing device according to claim 5, wherein, when setting the third attribute, the processor excludes the first attribute that has been set and displays candidates for the third attribute.

7. An information processing device comprising:
   a memory storing a plurality of sets of attributes for different types of processing; and
   a processor programmed to
   provide information concerning an object of processing in a second informing mode and information concerning a requester of the processing in a third informing mode at the same time, the object of the processing being an application to be executed in response to an instruction by the requester, wherein
   the second informing mode is a mode for providing information by using a second attribute which forms elements,
   the third informing mode is a mode for providing information by using, among the elements, a third attribute, which is different from the second attribute used in the second informing mode,
   the processor selects a single set among the plurality of sets stored in the memory based on the processing instructed by the requester, and the second and third attributes are determined by the selected single set, when the information processing device performs a first job using a first type of processing and a second job using a second type of processing, the processor displays a list of jobs including the first job and the second job, the first job being displayed in a first color scheme and the second job being displayed in a second color scheme different from the first color scheme, the first color scheme being the corresponding single set of the plurality of sets for the first type of processing, and the second color scheme being the corresponding single set of the plurality of sets for the second type of processing, and when an error occurs in the first job, the processor displays a message indicating the error, the message superimposing information indicating the first type of processing on a background color, the information indicating the first type of processing being displayed in a color of the first color scheme.

8. The information processing device according to claim 7, wherein the processor is further programmed to set the third attribute used in the third informing mode.

9. The information processing device according to claim 8, wherein, when setting the third attribute, the processor excludes the second attribute that has been set and displays candidates for the third attribute.

\* \* \* \* \*